United States Patent
Akkerman et al.

(10) Patent No.: US 10,047,232 B2
(45) Date of Patent: Aug. 14, 2018

(54) WATERBORNE COATING COMPOSITION WITH IMPROVED OPEN TIME

(71) Applicant: ALLNEX NETHERLANDS B.V., Bergen Op Zoom (NL)

(72) Inventors: Jaap Michiel Akkerman, Goes (NL); André Roelofs, Arnhem (NL); Richard Van Der Horst, Oss (NL); Robert Van Egmond, Bergen Op Zoom (NL)

(73) Assignee: Allnex Netherlands B.V., Bergen Op Zoom (*) Notice: Subject to any disclaimer, the term of this patent is extended or adjusted under 35 U.S.C. 154(b) by 0 days.

(21) Appl. No.: 15/110,752

(22) PCT Filed: Jan. 16, 2015

(86) PCT No.: PCT/EP2015/050803
§ 371 (c)(1),
(2) Date: Jul. 11, 2016

(87) PCT Pub. No.: WO2015/107163
PCT Pub. Date: Jul. 23, 2015

(65) Prior Publication Data
US 2016/0333199 A1    Nov. 17, 2016

(30) Foreign Application Priority Data
Jan. 17, 2014  (EP) .................................... 14151692

(51) Int. Cl.
*C08F 226/00*      (2006.01)
*C09D 7/12*         (2006.01)
(Continued)

(52) U.S. Cl.
CPC ............ *C09D 7/125* (2013.01); *C08F 220/12* (2013.01); *C08F 220/54* (2013.01);
(Continued)

(58) Field of Classification Search
CPC ............ C08F 2220/1808; C08F 220/14; C08F 220/54; C08F 220/56; C08F 220/58;
(Continued)

(56) References Cited

U.S. PATENT DOCUMENTS

| 136,025 A | 2/1873 | Booth |
| 227,705 A | 5/1880 | Schwartzkopff |

(Continued)

FOREIGN PATENT DOCUMENTS

| CN | 102597028 A | 7/2012 |
| DE | 3627969 A1 | 2/1988 |

(Continued)

OTHER PUBLICATIONS

Search Report for Priority European Patent Application No. 14151692.2 dated Dec. 9, 2014.
(Continued)

*Primary Examiner* — Satya Sastri
(74) *Attorney, Agent, or Firm* — HOYNG ROKH MONEGIER; Ramin Amirsehhi

(57) ABSTRACT

The invention relates to an aqueous coating composition comprising a film-forming first polymer and a second polymer for improving the open time, the wet edge time, adhesion and/or hardness of the resulting coating. The invention further relates to said novel second polymer, its use in coating compositions for improving the open time and coalescence. The water soluble second polymer is an addition polymer comprising 25-95 wt % specific non-ionic hydrophilic monomers A and 5-75 wt % of hydrophobic monomers B which second polymer is sparingly water soluble and a solution of only said second polymer in water has a substantially Newtonian flow behavior in a wide solid contents range.

21 Claims, 1 Drawing Sheet

(51) Int. Cl.

| | | |
|---|---|---|
| *C09D 7/65* | (2018.01) | |
| *C09D 5/02* | (2006.01) | |
| *C08F 220/54* | (2006.01) | |
| *C08F 220/56* | (2006.01) | |
| *C09D 133/26* | (2006.01) | |
| *C09D 139/06* | (2006.01) | |
| *C09D 175/04* | (2006.01) | |
| *C08L 75/04* | (2006.01) | |
| *C08L 101/12* | (2006.01) | |
| *C08G 18/65* | (2006.01) | |
| *C08G 18/69* | (2006.01) | |
| *C08G 18/75* | (2006.01) | |
| *C08G 18/08* | (2006.01) | |
| *C08G 18/34* | (2006.01) | |
| *C08G 18/36* | (2006.01) | |
| *C08F 220/12* | (2006.01) | |
| *C08F 226/10* | (2006.01) | |
| *C09D 133/00* | (2006.01) | |

(52) U.S. Cl.
CPC ......... *C08F 220/56* (2013.01); *C08F 226/10* (2013.01); *C08G 18/0823* (2013.01); *C08G 18/348* (2013.01); *C08G 18/36* (2013.01); *C08G 18/6541* (2013.01); *C08G 18/6547* (2013.01); *C08G 18/6576* (2013.01); *C08G 18/69* (2013.01); *C08G 18/755* (2013.01); *C08L 75/04* (2013.01); *C08L 101/12* (2013.01); *C09D 5/022* (2013.01); *C09D 7/65* (2018.01); *C09D 133/00* (2013.01); *C09D 133/26* (2013.01); *C09D 139/06* (2013.01); *C09D 175/04* (2013.01); *C08L 2201/54* (2013.01)

(58) Field of Classification Search
CPC ........ C08L 75/04; C08L 39/06; C08L 101/12; C08L 2201/54; C09D 133/00; C09D 133/26; C09D 139/06; C09D 175/04; C09D 5/022; C09D 7/65; C08G 18/348; C08G 18/0823; C08G 18/36; C08G 18/69; C08G 18/755; C08G 18/6541; C08G 18/6547; C08G 18/6576
See application file for complete search history.

(56) References Cited

U.S. PATENT DOCUMENTS

| | | |
|---|---|---|
| 293,173 A | 2/1884 | Hoxie |
| 497,930 A | 5/1893 | Singin |
| 700,979 A | 5/1902 | Pangborn |
| 3,345,203 A | 10/1967 | Kine et al. |
| 3,687,885 A * | 8/1972 | Abriss .................. C08L 57/04 524/375 |
| 3,736,286 A * | 5/1973 | Scott .................. C09D 133/08 524/516 |
| 4,063,010 A | 12/1977 | Marie et al. |
| 4,139,514 A | 2/1979 | Bassett |
| 4,552,908 A | 11/1985 | Nicks et al. |
| 4,748,989 A | 6/1988 | Nuber et al. |
| 4,816,534 A | 3/1989 | Nuber et al. |
| 5,122,582 A | 6/1992 | Potthoff-Karl et al. |
| 5,147,923 A | 9/1992 | Mueller |
| 6,107,397 A | 8/2000 | Blankenburg et al. |
| 6,204,319 B1 | 3/2001 | Houze et al. |
| 6,706,333 B2 | 3/2004 | Bremser et al. |
| 6,866,936 B2 | 3/2005 | Opolski |
| 6,872,789 B2 | 3/2005 | Brinkhuis et al. |
| 7,008,979 B2 | 3/2006 | Schottman |
| 7,022,759 B2 | 4/2006 | Martin et al. |
| 7,157,526 B2 | 1/2007 | Nickolaus et al. |
| 7,629,425 B2 | 12/2009 | Dobrawa et al. |
| 7,851,568 B2 | 12/2010 | Imai et al. |
| 8,426,500 B2 * | 4/2013 | Baumgart ............ C09D 5/4438 204/489 |
| 2001/0031826 A1 | 10/2001 | Laubender et al. |
| 2002/0013414 A1 | 1/2002 | Ramesh et al. |
| 2003/0105201 A1 | 6/2003 | Auschra et al. |
| 2003/0203991 A1 | 10/2003 | Schottman et al. |
| 2006/0258801 A1 | 11/2006 | Martin et al. |
| 2007/0043156 A1 | 2/2007 | Mestach et al. |
| 2012/0088663 A1 | 4/2012 | Uluschneider et al. |

FOREIGN PATENT DOCUMENTS

| | | |
|---|---|---|
| DE | 10029802 A1 | 1/2002 |
| DE | 10106567 A1 | 8/2002 |
| DE | 69937967 T2 | 1/2009 |
| EP | 0136025 A2 | 4/1985 |
| EP | 0210747 A1 | 2/1987 |
| EP | 0593151 A1 | 4/1994 |
| EP | 0927198 A1 | 7/1999 |
| EP | 1125949 A1 | 8/2001 |
| EP | 1132436 A1 | 9/2001 |
| EP | 1171534 B1 | 12/2002 |
| EP | 1492850 A1 | 1/2005 |
| EP | 1328591 B1 | 8/2007 |
| JP | 3135151 B2 | 2/2001 |
| NL | 6501031 A | 8/1965 |
| WO | 00/56827 A1 | 9/2000 |
| WO | 02/33012 A2 | 4/2002 |
| WO | 02/33013 A1 | 4/2002 |
| WO | 32/33008 A1 | 4/2002 |
| WO | 2004085556 A1 | 10/2004 |
| WO | 2007131959 A1 | 11/2007 |
| WO | 2010066902 A1 | 6/2010 |
| WO | 2010133527 A2 | 11/2010 |
| WO | 2012087920 A1 | 6/2012 |
| WO | 2012130817 A1 | 10/2012 |

OTHER PUBLICATIONS

International Search Report for PCT/EP2015/050803 dated Jun. 2, 2015.

International Preliminary Report on Patentability for PCT/EP2015/050803 dated Jul. 19, 2016.

W. Bremser et al, "A method for controlled radical polymerization and for the synthesis of solvent free dispersions",Prog. Org. Coatings, 45, (2002), p. 95-99.

\* cited by examiner

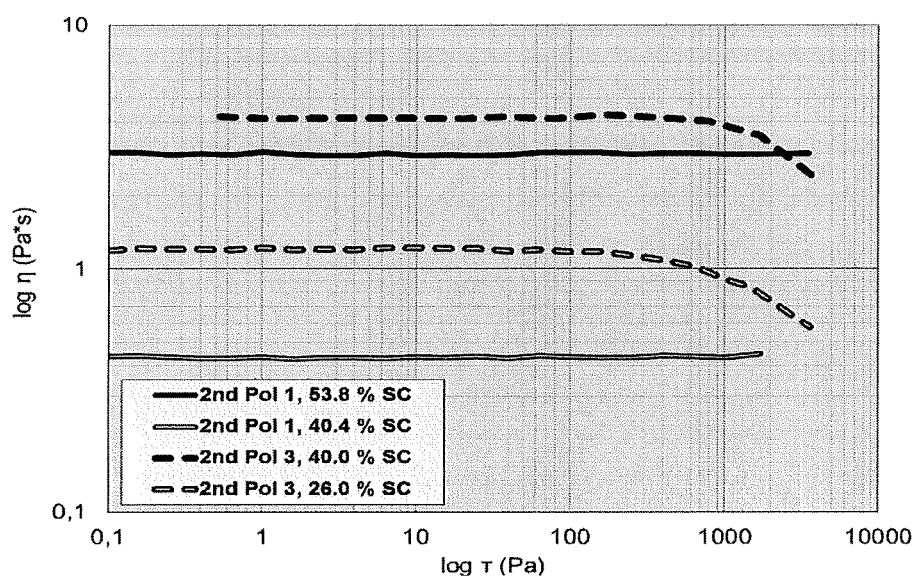

WATERBORNE COATING COMPOSITION WITH IMPROVED OPEN TIME

CROSS REFERENCE TO RELATED APPLICATIONS

This application is a U.S. National Stage under 35 USC 371 of PCT application number PCT/EP2015/050803 filed on 16 Jan. 2015, which claims priority from EP application number 14151692.2 filed on 17 Jan. 2014. Both applications are hereby incorporated by reference in their entireties.

BACKGROUND OF THE INVENTION

The invention relates to an aqueous coating composition comprising a film-forming first polymer and a second polymer for improving the open time, the wet edge time, adhesion and/or hardness of the resulting coating. The invention further relates to said novel second polymer, its use in coating compositions for improving the open time, its use as coalescing agent and to a method for making the second polymer and aqueous coating composition.

DESCRIPTION OF THE RELATED ART

Legislation on the emission of volatile compounds is driving the switch from solvent borne to waterborne coating compositions (paints). However, waterborne coating compositions still need improvement to achieve, or to match, the advantageous properties of their solvent borne predecessors. A particular problem with waterborne coating compositions is the short period of time in which a freshly applied layer of coating can be re-manipulated without leaving visible defects in the cured coating like brush marks, roller marks, spray dust (commonly known as 'overspray') or visible lines at joints between adjacent coating layers.

A layer of a coating composition freshly applied to a substrate is said to be open when it is still in a state where it can be manipulated during the curing without leaving substantial visible defects in the cured coating. The open time is the period of time between the point of first application of a coating layer up to the point where corrections can no longer be made in the wet paint film without leaving visible defects.

A layer of a coating composition freshly applied to a substrate is said to have a wet edge when it is still possible to blend it within the application period ("wet edge time") with a subsequently added freshly applied adjacent layer of the coating composition during its application period without a visible seam or overlap of the subsequently applied coating layers in the cured coating. The wet edge time is the time period between the point of fresh application of a coating layer up to the point when it is no longer fluid enough to blend with a subsequently applied layer of coating composition in a manner that does not leave a visible seam or lapline.

It is a longstanding desire to improve these characteristics for waterborne paints. Waterborne paints are based on aqueous coating compositions comprising a first film-forming polymer (the binder) dispersed in water and optional paint additives.

Film-forming polymers in aqueous coating compositions typically are meant to be polymers that have a glass transition below room temperature, typically below 60, 45 or more commonly below 30° C., optionally in combination with a glass transition modifying substance, such that they have sufficient flowability to form a coherent film on a substrate in ambient use temperatures, preferably in a temperature range between 0 and 60° C.

Aqueous coating compositions that may benefit from an increased open time and wet edge time include: aqueous vinyl polymer dispersions, aqueous alkyd emulsions, aqueous polyurethane dispersions and mixtures thereof. Such polymer dispersions can have excellent drying properties, chemical and water resistance and favorable mechanical properties such as hardness, adhesion, block- and scratch resistance but coating compositions based on these binders alone typically suffer from a short open or wet edge time.

It is believed that longer open time and wet edge time can be achieved by using water-soluble additives or co-binders in the formulation of coatings. For example, water-soluble co-solvents such as alkylene glycols (e.g. ethylene glycol, propylene glycol, 2-methyl-2,4-pentanediol) are considered to have a beneficial—though limited when used in amounts limited by legislation (e.g. 2-6% on weight of total paint)—influence on open time. Alternatively, water-soluble homopolymers are suggested to be useful to achieve extended open times in waterborne coatings (Examples of such polymers being polyvinyl alcohol, polyethylene glycol, poly(meth) acrylamide, and poly 2-ethyl oxazoline). However, it is a general problem of the known homopolymer open time improvers that the resulting coatings exhibit poor water-resistance. This implicates in practice that only very low levels can be applied, thus reducing the effectiveness of improving open time or wet edge time.

U.S. Pat. No. 4,552,908 describes the use of water-dispersible film-forming polymers in formulating paints with improved brushability, lapping, and flow-out of brushmarks.

EP 0136025 describes the use of a polymer of defined molecular weight which contains either anionisable or cationisable groups and also non-ionisable water-soluble moieties (derived for example from polyethylene glycol) for formulating paints with extended open time. Since this polymer is completely water-soluble and is used as the sole binder the coating described exhibit poor water resistance.

U.S. Pat. No. 4,139,514 describes addition of a water-soluble oligomer to a coating. The description refers to addition of an acid rich oligomer to latex to achieve an open time in excess of 20 minutes. However, the technology is limited to using an alkali-soluble oligomer which will result in water sensitivity of the final coating, thus requiring the addition of a melamine crosslinker and curing at elevated temperatures in order to achieve water resistance.

EP1132436 discusses the addition of polyalkylene oxide group modified (meth)acrylic monomer units to aqueous high gloss acrylic polymer dispersions. The polymer described however is thermoplastic so the chemical resistance, hardness and mechanical properties are expected to be inferior.

US 20010031826 A1 discusses addition of polyalkylene oxide group modified (meth)acrylic monomer units to aqueous high gloss acrylic polymer emulsions used as single binder in glossy paint formulations to improve open time. In order to obtain acceptable coatings properties in a thermoplastic polymer the molecular weight has to be high, typically above Mn 200,000. Consequently a high concentration of ethylene oxide monomer is necessary to obtain the desired application properties. The high concentration, however, will negatively influence the water resistance.

EP1492850 discusses blending of a non-crosslinking polyethylene glycol modified vinyl oligomer with a dispersed polymer. This document discusses inclusion of vinyl polymers incorporating 0-45 wt % polyethylene oxide functionality into oligomers used to extend open time and wet edge time. It is believed that claimed single use of non-ionic hydrophilic functionality—when used in a water dispersed polymer—leads to problems like water sensitivity, coagulation, depletion flocculation and other stability problems. When using the necessary high amount of non-ionic hydrophilic groups to obtain the claimed open time/wet edge properties, leads to unacceptable water resistance and stability.

EP 210747 discusses inclusion of eicosanols as evaporation suppressants in coating compositions to increase open time. However, because eicosanol additive boiling points are so high as to prevent their evaporation during curing, the additive remains in the cured coating and thus leads to water sensitivity problems.

EP 0593151 describes to improve open time of a latex coating composition by using an amphiphilic low molecular weight copolymer and groups that reacts with groups on the latex polymer to improve water resistance.

EP1328594 describes the use of various addition copolymers to improve open time, however all with a limited solubility in water up to 70 or 80% depending on the application.

WO2012087920 describes open time extender based on watersoluble poly-addition polymers using hydrophobic, ionic-hydrophilic and crosslinking monomers in amounts less than 20% by weight in a coating composition.

U.S. Pat. No. 227,705 describes latex polymers for use as open time extenders. This publication relates to open time improvers for low VOC latex aqueous coatings.

PCT/EP2012/055356 describes an aqueous coating composition comprising an aqueous film forming polymer binder dispersion and as open time improver about 40-60 wt % of a second polymer binder comprising substantial amounts of ionic/acid functional and monomers containing a polyethylene glycol or mono alkoxy polyethylene glycol moiety.

Despite the progress made in the art, there remains a need for further improvement of the balance of properties of waterborne coating compositions of on one hand the open time and wet edge time properties and on the other hand the stability of the aqueous composition, the drying properties like curing speed and hardness development and the resulting cured coating properties like adhesion, water resistance, gloss, hardness, block and scratch resistance.

BRIEF DESCRIPTION OF THE INVENTION

According to the invention there is provided an aqueous coating composition comprising one or more film-forming first polymers dispersed in an aqueous solution of a water soluble second polymer, wherein the water soluble second polymer is an addition co-polymer comprising
  a. 25-95 wt % non-ionic hydrophilic monomers A comprising an unsaturated group with a pendant group comprising at least one nitrogen in cyclic or linear amide or amine which is covalently bonded to the unsaturated group directly with the nitrogen (—N—), or over a carbonyl (—(C=O)—), ester(—(C=O)—O—), acetate (—O—(C=O)—) or C1-C5 alkyl (—R—) group, wherein said pendant groups may comprise hydrocarbon with 5 or less connected carbon atoms and may comprise amine groups only in non-ionic form,
  b. 5-75 wt % of hydrophobic monomers B selected from
    i. alkyl-, aryl- or arylalkylesters, preferably C1-C4 alkylesters, of (meth-) acrylic acid or styrenic monomers, most preferably (m-)ethylacrylate,
    ii. vinyl ester,
  c. 0-20 wt % of crosslinking monomers C different from monomers A and B comprising cross-linkable groups,
  d. 0-5 wt %, of hydrophilic ionic monomers D,
  e. 0-20 wt %, of monomers E different from monomers A-D,
  f. 0-10 wt % of chain transfer agents F,
  wherein the total weight of A to F is 100 wt % and
  wherein the water soluble second polymer comprises less than 20 wt %, more preferably less than 15, 10, 5 and most preferably 0 wt % relative to the total weight of the water soluble second polymer of (poly-)ethylene oxide or (poly-)propyleneoxide groups. (m-)ethylacrylate means methylacrylate or ethylacrylate.

The invention further relates to novel water soluble polymers in any of the embodiments herein described and to the use of the water-soluble second polymer as described in any of the embodiments herein described, in an aqueous coating composition for increasing at least one of the properties of open time, wet edge time, adhesion, drying properties of the aqueous coating composition or gloss, water resistance or hardness of the resulting coating, in particular at ambient curing temperatures. The invention also relates to the use of a water-soluble second polymer as described herein as a coalescence agent in an aqueous coating composition.

The inventors have surprisingly found that with the water soluble polymer an open time of the aqueous coating composition could be achieved of 15 or even 20 minutes without unacceptable negative effect on the curing speed or on coating properties such as water resistance, whereas state-of-the-art aqueous coating compositions have an open time of about 5 to 15 min and compromise on coating properties. This is an important invention because it will make decorative painting less critical and will give results closer to solvent borne coating compositions.

The invention also relates to a water soluble second polymer characterised in that a solution of only said second polymer in water has a substantially Newtonian flow behaviour at solids contents ranging between 30 and 50, preferably 30-60 and more preferably even up to 70 wt % of second polymer relative to total aqueous solution wherein the water soluble second polymer is sparingly soluble and comprises substantially no ionic or (poly-)ethylene oxide or (poly-)propyleneoxide groups.

Newtonian flow behaviour means that the viscosity is independent of the shear rate. This is very difficult to achieve for polymers which generally have a much higher viscosity at low shear rate compared to high shear rate (pseudo-plastic or shear thinning behaviour). After application of a layer of the coating composition on a substrate, the water slowly evaporates and therefore the solids content in the wet coating steadily increases. During drying, the viscosity quickly increases and at some point it becomes difficult to brush or roll the paint layer. The available time for handling is called open time. It was found that the said sparingly water-soluble second polymer having substantially Newtonian behaviour provides significant increase of the open time to an aqueous coating composition comprising first film-forming polymer.

An additional advantage is that small amounts of the water-soluble second polymer are needed to provide an acceptable open time. The improvement of the open time can already be achieved with relatively small amounts of second polymer of 0.2 to 0.5 wt % or more relative to the total of first and second polymer. This is not only advantageous in view of cost, but lower amounts also result in coatings with improved water resistance and equal to the water resistance of a coating composition not containing said second polymer. Furthermore, the water soluble second polymer is to a high degree compatible with the first film forming polymer. These properties are believed to result in on one hand improvement of the open time and on the other hand maintaining good drying and coating properties as described above.

In addition, the presence of the water soluble second polymer dissolved in the aqueous phase does not significantly impact stability of the first film forming polymer dispersion; no phase separation or any kind of flocculation or coagulation was observed.

DESCRIPTION OF FIGURES AND DRAWINGS

FIG. 1: Is a graph of the flow curves wherein $\log(\tau)$ ($\tau$ being shear stress in Pa) is plotted versus $\log(\eta)$ ($\eta$ being viscosity in Pa·s) of second polymer 1 and 3. Polymer 1 is sparingly soluble in water but still Newtonic in rheology at the given solids content. Polymer 3 is also sparingly soluble in water but has no more Newtonic rheology at the given solids contents.

DETAILED DESCRIPTION OF THE INVENTION

The Watersoluble Second Polymer
Non-Ionic Hydrophilic Monomers A

As described above, the monomers A have an unsaturated group that is polymerisable by addition polymerisation and a pendant group that is non-ionic but hydrophilic and provide water solubility to the water-soluble second polymer.

The 25-95 wt % non-ionic hydrophilic monomers A comprise an unsaturated group with a pendant group comprising at least one nitrogen in cyclic or linear amide or amine which is covalently bonded to the unsaturated group directly with the nitrogen (—N—), or over a carbonyl (—(C=O)—), ester(—(C=O)—O—), acetate (—O—(C=O)—) or C1-C5 alkyl (—R—) group, wherein said pendant groups comprise hydrocarbon with at most 5 connected carbon atoms and may comprise amine groups only in non-ionic form. In view of ease of processing and flexibility in combining first and second polymers, the non-ionic hydrophilic monomers A are not ionisable and the second polymer does not comprise ionisable monomers A, in particular amines.

Preferably, non-ionic hydrophilic monomers A comprise pendant groups selected from the group of i) —(N)-amide, ii) cyclic —(N)-amide, iii) —(C=O)-amide, iv) cyclic (C=O)-amide, v) cyclic (N) amine, vi) cyclic (C) amine, vii) —(C=O)-esteramine and viii) (meth-)acrylonitrile. In case the pendant groups in the water-soluble second polymer comprise amine groups, for example —(C=O)-esteramine, the pH in the coating composition is such that the amine is in non-ionic form. Here and hereafter (meth)acrylate means acrylate or methacrylate and (m)ethyl means methyl or ethyl.

Monomers A are preferably selected from the group of
i. Monomers comprising a pendant (N)-amide of the formula —N(—R)—C(=O)—R', groups,
ii. Monomers comprising a pendant cyclic (N)-amide of the formula —N(-)—C(=O)—R"—, wherein R"— forms a cyclic 3-6 atom ring with the N(-),
1. Including monomers comprising pendant —N(—C(=O)—)₂—R" (cyclic imides) wherein R" forms a cyclic 3-6 atom ring with both C=O (cyclic (N-) amide groups,
iii. Monomers comprising a pendant (C=O)-amide of the formula —C(=O)—N(—R)—R,
iv. Monomers comprising a pendant cyclic (C=O)-amide of the formula —C(=O)—N(-)—R"—, wherein R"— forms a cyclic 3-6 atom ring with the N(-),
v. Monomers comprising a pendant cyclic (N) amine group of the formula —N(-)—R"— wherein R" forms a cyclic 3-6 atom ring with N(-),
vi. Monomers comprising a pendant cyclic (C) amine of the formula —C(-)—N—R"— wherein R" forms a cyclic 3-6 atom ring with C(-),
vii. monomers comprising a pendant (C=O)-ester group of the formula —C(=O)—O—R'—N(—R)₂,
viii. acrylonitrile or methacrylonitrile,
wherein R can be hydrogen or a hydrocarbon, R' can be a hydrocarbon or a hydrocarbon with nitrogen or carbonyl or both and R" can be a hydrocarbon or a hydrocarbon with at least one of nitrogen, oxygen or carbonyl in or on the cyclic ring, wherein each R, R' and R" can be chosen independently of each other and each hydrocarbon comprises 5 or less connected carbon atoms and wherein any amine is in non-ionic form.

Examples of monomers A that are cyclic imides of type ii).1, are N-alkenylated derivatives of the imides which are selected from the group comprising succinimide, glutarimide, maleimide, citraconic imide, phthalimide, the imide of himic anhydride, hexahydrophthalimide and the imides of tricarboxylic butane acid and of the esters of that acid, and particularly the N-vinylsuccinimide, N-allylsuccinimide, N-butenylsuccinimide, N-vinylmethyl-2 succinimide, N-vinyldimethyl-2,3 succinimide, N-vinylglutarimide, N-vinylmaleimide, N-vinylphthalimide, N-vinylcitraconimide, N-vinylhexahydrophthalimide, the N-vinyl imide of himic anhydride and the N-vinyl imide of tricarboxylic butane acid or the esters of that acid.

More preferably, the pendant groups in monomers A of type i) to viii) are according to formulae 1-9 respectively, as illustrated below.

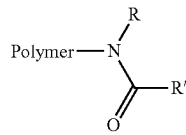

Formula 1

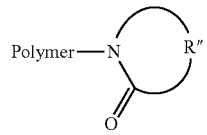

Formula 2

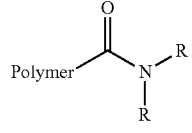

Formula 3

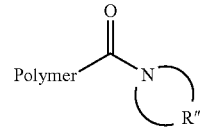

Formula 4

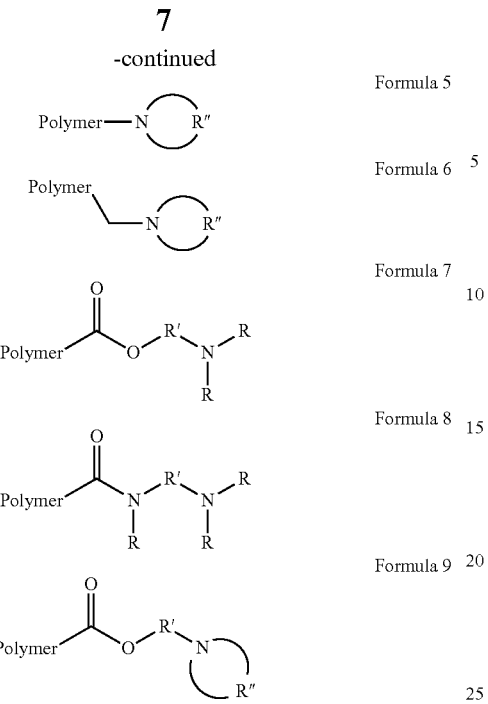

In the above formulae R, R', and R" are defined as described above. Formula 8 is a specific embodiment of formula 3 and Formula 9 is the cyclic variant of the embodiment of formula 7.

Most preferably, the monomers A in the water soluble second polymer are chosen from the group of (N)-vinylpyrrolidone (CAS number 88-12-0), 2-(N,N-dimethylamino)ethyl(meth-) acrylate (CAS number 2867-47-2, resp. 2439-35-2), N,N-dimethyl(meth-)acrylamide (CAS number 2680-03-7) N,N-diethyl(meth-) acrylamide, (N) vinyl imidazole (CAS number 1072-63-5), (N) vinylcaprolactam (CAS number 2235-00-9), (N)-vinylsuccinimide (CAS number 2372-96-5), N-vinylpiperidon (CAS number 4370-23-4), 2-vinylpyridine (CAS number 100-69-6), (N) vinyl maleimide (CAS Number 7685-94-1), (N) vinyl citraconimide, (N) vinyl phthalimide (CAS number 3485-84-5), 2-propenamide, N-[3-(dimethylamino)-2,2-dimethylpropyl]-methacrylamide (CAS number 75150-23-1), methacrylamido ethyl ethylene urea (CAS number 3089-19-8), 2-morpholinoethyl methacrylate (CAS number 55972-47-9), 2-morpholinoethyl acrylamide (CAS number 13276-17-0), N vinyl carbazole (CAS number 1484-13-5), N vinyl acetamide (CAS number 5202-78-8), most preferably (N) vinylpyrrolidon, (N) vinyl caprolactam and 2-(N,N-dimethylamino)-ethyl(meth-)acrylate.

Preferably, at least 40 wt %, more preferably at least 50, 60, 70, 80 or 90 and most preferably 100 wt % of all non-ionic hydrophilic monomers A in the second polymer are preferred monomers i)-viii) described above or preferably according to formulae 1-9 or more preferably the specific monomers A chosen from the above list.

The amount of monomers A in the water soluble second polymer is 25-95 wt %, preferably at least 30, 35, 40, 45, 50, 55 or 60 wt %, but can be as high as 70, 75, 80, 85, 90 or 95 wt %. The amount of monomers A in the second polymer is chosen in view of the balance of hydrophilicity of the monomers A in combination with the type and amount of hydrophobic monomers B and optional other minority monomers, such that the water-soluble second polymer is just water-soluble (sparingly water-soluble). In view of achieving sparingly water solubility and good coating properties, it is preferred that the water-soluble second polymer comprises 25-95, preferably 30-90 wt % of said monomer A in combination with 5-75, preferably 10-70 wt % monomers B (relative to total A+B).

The hydrophilic monomers A provide water solubility to the water-soluble second polymer. Therefore, monomers A preferably have a Hoy solubility parameter (non-hydroplastized) of the corresponding homopolymer of said monomers between 20 and 30, more preferably between 20.0 and 25.0 most preferably between 21 and 24.0 $(J/m^3)^{1/2}$. The lower limit can be 21, 22, 23, 24 and the upper limit can be 25, 27 or 29. The Hoy solubility parameter δT is calculated according to the method of D. W. van Krevelen (Properties of Polymers, Page 189-220, 1990, ISBN 0-444-88160-3). Hoy values for some monomers are presented in Table 1 below. At values above 30, the monomers A have a hydrophilicity which may disadvantageously effect coating properties. At values below 20, the monomers A have low hydrophilicity which disadvantageously effects water solubility. When using two or more different monomers A, the Hoy value of individual monomers A may be chosen between 20 and 30, but it is preferred that the weight average Hoy value of the one or more monomers A is between 21 and 25. Preferably the majority of monomers A have Hoy value between 21.5 and 24.

Hydrophobic Monomers B

The monomers B are different from monomers A, and C to F and have an unsaturated group that is polymerisable by addition polymerisation and are hydrophobic and are selected from alkyl-, aryl- or arylalkylesters, preferably C1-C4 alkylesters of (meth-)acrylic acid or styrenic monomers, or vinylesters like vinyl neodecanoate, vinyl neononanoate (known as VeoVa 10 and 9®, vinylacetate or vinylproprionate. Most preferred is (m)ethyl(meth-)acrylate.

The amount of hydrophobic monomers B is generally between 5 and 75 wt %. Higher amounts would impair water solubility. The presence of 10-75 wt % monomers B is preferred in view of achieving compatibility with the first polymer and/or good coating properties. The lower limit of the amount of monomers B can be 10, 15, 20, 25 or even 30 wt % and the upper limit of the amount of monomers B can be 70, 65, 60, 55, 50, 45, 40, 35, 30 or 25 wt %. The preferred amount depends on the hydrophobicity of monomer B and the type of monomers A. In any case, the amount of monomers B and the hydrophobicity thereof are chosen in combination with monomers A such that the second polymer is water-soluble.

In view of the envisaged coating properties it is preferred that at least 80, preferably 90 or even 95% of all hydrophobic monomers B in the second polymer have a monomer Tg lower than 120, preferably lower than 100, 50 or 20 and more preferably less than −10° C.

The hydrophobic monomers B are preferably characterised by a Hoy solubility parameter of the corresponding homopolymer of said monomers larger than 16, preferably 19 and more preferably 20.0 $(J/m^3)^{1/2}$ and preferably below 26.0, more preferably below 24.0 $(J/m^3)^{1/2}$. The Hoy values for some monomers B are presented in Table 1 below. At values below 16 the monomers or not considered sufficiently hydrophobic and at a value above 26, the monomers B have a hydrophilicity which may disadvantageously effect coating properties. When using two or more different monomers B, the weight average Hoy value is considered. Preferably the weight average Hoy value of monomers B is between 16.0 and 26, preferably between 19 and 24 and more preferably between 19 and 21. Preferably the majority of monomers B has a Hoy value in the specified ranges.

The water-soluble second polymer comprises a major part of water-soluble non-ionic monomers A, most preferably vinyl pyrollidone, vinyl caprolactam N,N-dimethylamino acrylamide with sparingly insoluble monomers B, most preferably (m-)ethyl(meth-)acrylate, wherein the amount of sparingly insoluble monomers B and optional other monomers D-F is such that the copolymer is only just sufficiently hydrophilic to be water soluble. Preferably, the water-soluble second polymer has an overall weight average Hoy solubility parameter larger than 21.0, preferably larger than 21.5 $(J/m^3)^{1/2}$ and preferably less than 24, preferably 22 $(J/m^3)^{1/2}$.

Preferably, hydrophobic monomers B in the second polymer are chosen from the group of methyl-, ethyl- or butyl-(meth-)acrylate or mixtures thereof, preferably (m)ethyl (meth)acrylate. Preferably at least 60 preferably at least 70, 80, 90 or 95 wt % and most preferably 100 wt % of hydrophobic monomers B in the second polymer are chosen from these most preferred monomers. These monomers are suitable to be combined in substantial amounts with monomers A, typically in amounts from at least 5, 10, 20 or even at least 30 wt % but not more than 75 wt % (relative to total weight of second polymer).

TABLE 1

Monomer A, CAS numbers, Tg values (° C.) and Hoy solubility parameter values (non-hydroplasticised) $((J/m^3)^{1/2})$.

| | CAS number | Tg (° C.) | Hoy solubility parameter |
|---|---|---|---|
| Monomer A options | | | |
| NN dimethyl methacrylamide NNDMA | 2680-03-7 | 180 | 20.2 |
| N-vinyl caprolactam | 2235-00-9 | 180 | 20.7 |
| N-vinyl pyrrolidone | 88-12-0 | 176 | 22.0 |
| Diacetone acrylamide | 2873-97-4 | 127 | 23.1 |
| Acrylonitril | 107-13-1 | 97 | 25.3 |
| N,N dimethylamino ethyl acrylamide | 2867-47-2 | −35 | 26.6 |
| Methacrylic acid (pH 7) | 79-41-4 | 44 | 27.9 |
| Butyl methacrylate | 97-88-1 | 20 | 20.1 |
| Methacryl amide | 79-39-0 | 77 | 25.7 |
| Acrylic acid (pH 7) | 79-10-7 | −68 | 36.2 |
| Acryl amide | 79-06-1 | 165 | 28.8 |
| Monomer B options | | | |
| Lauryl methacrylate | 142-90-5 | −65 | 16.4 |
| iso Bornyl methacrylate | 7534-94-3 | 94 | 16.7 |
| 2-Ethyl hexyl acrylate | 103-11-7 | −68 | 18.3 |
| Styrene | 100-42-5 | 100 | 19.3 |
| Methyl methacrylate | 80-62-6 | 105 | 19.4 |
| Butyl acrylate | 141-32-2 | −54 | 19.5 |
| Ethyl acrylate | 140-88-5 | −24 | 20.1 |
| Methyl acrylate | 96-33-3 | 10 | 20.6 |
| Vinylproprionate | | | 20.1 |
| Vinylacetate | | | 19.1 |
| Veova 9 Vinyl neononanoate | 54423-67-5 | 70 | n.a.* |
| VeoVa 10 Vinyl neodecanoate | 51000-52-3 | −3 | n.a.* |
| Monomer C options | | | |
| Acetoacetoxyethyl methacrylate | 21282-97-3 | 17 | 21.5 |
| Acetoacetoxyethyl acrylate | 21282-96-2 | −23 | 22.2 |

*could not be calculated because exact chemical composition of the C9 and C10 fatty acids is not known Crosslinking Monomers C The water-soluble second polymer further comprises 0-20 wt % of crosslinking monomers C different from monomers A and B comprising cross-linkable groups. The crosslinkable groups react with a crosslinking agent and/or with reactive groups on the first polymer to get chemically bonded in the cured coating. Effective amounts of cross-linking monomer C range between 2, 5, 7, 10 up to 20 wt %.

The cross-linking monomers C are different from monomers A and B and preferably are chosen from the group of unsaturated monomers comprising hydroxy-, epoxy-, amine- or carbonyl cross-linking functional groups. Said cross-linking functional groups may be chosen such that the second polymer react with itself, with reactive groups on the first polymer or with a separate crosslinking agent. The aqueous coating composition may optionally comprise one or more cross-linking agent reactive with crosslinkable groups on the first or second polymer or both. The cross-linking groups on the first and second polymer can be different but preferably are the same, such that they can crosslink with the same crosslinking agent. Most preferred crosslinking groups are hydroxyl groups and preferably monomer C is hydroxyalkylester of (meth)acrylic acid or diacetonacrylamide. Preferably, the coating composition is curable at ambient temperature and accordingly crosslinking functional groups and crosslinking agents are chosen to be reactive at ambient temperature as is known in the art.

Examples of monomers C having crosslinkable groups include hydroxy-functional monomers such as hydroxyethyl (meth) acrylate, hydroxypropyl (meth) acrylate, hydroxybutyl (meth) acrylate, also monomers having latent hydroxy groups such as glycidyl methacrylate can be used. Hydroxy-functional groups can be cross-linked with polyisocyanates which may be blocked or not, melamines, and urea resins. Further examples include derivatives of (meth) acrylamide such as N-methylol (meth) acrylamide and diacetone acrylamide. Vinyl monomers possessing an acetoacetoxy functional group can also be present in the monomer composition. Examples of such vinyl monomers are acetoacetoxyethyl methacrylate, acetoacetoxyethyl acrylate, acetoacetoxy(methyl)ethyl acrylate, acetoacetoxypropyl acrylate, allyl acetoacetate, acetoacetamidoethyl (meth) acrylate, and acetoacetoxybutyl acrylate. Such carbonyl functional groups can be crosslinked by (poly-)amino or (poly-)hydrazine groups on the polymer or on a separate crosslinking agent.

Another suitable crosslinking monomer is diacetonacrylamide. This is a monomer A type according to formula 3, hence not a monomer C. With such monomers A comprising carbonyl groups in any of groups R' or R", the open time improvement can be achieved according to the invention together with crosslinkability with the advantage of having to add less or no separate monomers C.

Ionic Monomers D

The water-soluble second polymer may further comprises 0-5 wt %, of hydrophilic ionic monomers D to moderate solubility, but the amount of hydrophilic ionic monomers D must be low in view of the high hydrophilicity and preferably is less than 4, 3, 2, 1 or even 0.5 wt % and most preferably is 0 wt % (non-ionic).

The second polymer may comprise minor amount of acid functional ethylenically unsaturated monomers D or ethylenically unsaturated monomers comprising acid functional group precursors. These acid functional groups can be carboxylic, sulphonic or phosphonic. Carboxylic acid groups have poor water solubility when not neutralized and preferably are not neutralised and in ionic form in the aqueous coating composition. Preferably, monomers such as (meth)acrylic acid are used. Other possible carboxylic acid-functional monomers are itaconic acid, fumaric acid maleic acid, citraconic acid, or the anhydrides thereof. Besides monomers having carboxylic acid functionality also monomers possessing an acid-functional group other than the carboxylic one can be present in the monomer composition, such as ethylmethacrylate-2-sulfonic acid or 2-acrylamido-2-methylpropane sulfonic acid. The concentration of the acid functional ethylenically unsaturated monomers is preferably limited to 0-5 wt % or more preferably substantially lower as described above (see monomers D). In case of higher levels of the described monomers the second polymer tends frequently to be incompatible with the first polymers leading to coagulation that ends in gelated blends.

Monomers E Different from Monomers A-D

The water-soluble second polymer further comprises 0-20 wt %, of monomers E different from monomers A-D. A limited amount of monomers different from monomers A-D can be incorporated without risking the advantageous properties that are objective to the invention, for example for providing particular functionality to the coating composition, for example monomers comprising groups that provide anti-fouling, UV stability or wet adhesion properties to the coating or azide functional monomers, blocked isocyanate monomers, non-bleed monomers. In view of desired open time improvement and coating properties the amounts are small, preferably less than 17, 15, 12, 10, 8, 5, 3, 2, 1 and most preferably 0 wt %.

Chain Transfer Agents F

The water-soluble second polymer further comprises 0-10 wt % of chain transfer agents F. As is known in the art chain transfer agents can be used for keeping low molecular weight and a narrow molecular weight distribution.

In a preferred embodiment a chain transfer agent (F) is used to bring the molecular weight between 2,000 and 120,000. Exemplary chain transfer agents are butyl mercaptan, mercaptopropionic acid, 2-ethylhexyl mercaptopropionate, n-dodecylmercaptan, t-dodecylmercaptan, n-butyl mercaptopropionate, mercaptoethanol, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate. Other, non sulfur based chain transfer agent include halogenated hydrocarbons or catalytic chain transfer agents such as Cobalt-chelates such as used in N. S. Enikolopyan et al, J. Polym. Chem. Ed, Vol 19, 879 (1981). Also alpha-methyl styrene dimer or oligomers of alpha-methyl styrene dimer can be used as explained in US 2007/0043156 A1 and U.S. Pat. No. 6,872,789. Yet another method to synthesize polymer with a well defined molecular weight is the use of diarylethene. The use of diarylethene is described in detail in W. Bremser et al, Prog. Org. Coatings, 45, (2002), 95 and JP 3135151, DE 10029802 and US 2002/0013414. A commonly used diarylethene includes diphenylethene.

The advantage of the water soluble second polymer is that it improves open time without having to rely on the prior art open time improving groups like (poly-) ethylene oxide or (poly-) propyleneoxide groups that are disadvantageous for the coating properties, in particular water resistance. According to the invention the second polymer comprises ethylene oxide or propyleneoxide substituent groups in an amount less than 20 wt %, more preferably less than 15, 10, 5 and most preferably 0 wt % relative to the total weight of the water soluble second polymer.

In a preferred embodiment, the water-soluble second polymer has a weight average molecular weight Mw of 2,000 to 200,000, preferably 10,000-50,000 gr/mole and is obtainable by addition polymerization of a monomer mixture comprising:

a. 25 to 95 wt %, preferably 40-95 wt %, more preferably 60-90 wt % (N)-vinyl pyrrolidone, (N)-vinylcaprolactam, N,N-dimethylamino acrylamide monomers A, most preferably (N)-vinyl pyrrolidone b. 5 to 75 wt %, preferably 10-60 wt %, more preferably 10-40 wt % C1-C4 alkyl(meth-)acrylate monomers B, most preferably methyl- or ethyl(meth-)acrylate, c. 0 to 20 wt % cross-linking monomers C with a functional group for cross-linking, d. substantially no ethylenically unsaturated acid functional monomers D or precursors thereof, e. 0-10 wt % monomers E different from monomers A to D f. 0 to 10 wt % of chain transfer agents F, wherein the sum of a) to f) is 100 wt %.

The water soluble second polymers preferably have a glass transition temperature Tg of from −30 to 180° C. Preferably, the Tg is at least 0° C., preferably at least 20° C., more preferably at least 35° C., and most preferably at least 45° C. Good results were obtained with Tg even above 60, 70, 80 and more than 90 and 100 C. The Tg is defined as the Tg calculated with the Fox formula (see Ullmanns Enzyklopaedie der Technischen Chemie, 4$^{th}$ Edition, Vol 19, Weinheim 1980 p 17 and 18) and by using Tg values of the homo-polymers as mentioned in Table 1 or otherwise as known in the art. The Tg of the second polymer can be and preferably is high because in water the second polymer is hydroplastisized due to which the effective Tg in the aqueous composition and during drying is low resulting in a low minimum film forming temperature. Preferably the second polymer has a Tg between 0 to 180° C.

The water soluble second polymer generally has a weight average molecular weight Mw from 2,000 to 200,000, preferably from 5,000 to 100,000, more preferably 7,000 to 70,000 and most preferably from 10,000 to 50,000 gr/mol (determined by gel permeation chromatography using hexafluoro-i-propanol as eluent and using polymethylmethacrylate (PMMA) standards).

In a most preferred embodiment, the water soluble second polymer is a copolymer of N-Vinyl Pyrrolidone (VP) and Ethyl Acrylate (EA).

Water Soluble Second Polymer Having Substantially Newtonian Rheology

The invention also relates to a water soluble second polymer characterised in that a solution of only said second polymer in water has a substantially Newtonian flow behaviour at solids contents ranging between 30 and 50, preferably 30-60 and more preferably even 30-70 wt % of second polymer relative to total aqueous solution wherein the water soluble second polymer is sparingly soluble and comprises less than 20 wt %, more preferably less than 15, 10, 5 and most preferably 0 wt % relative to the total weight of the water soluble second polymer of (poly-)ethylene oxide or (poly-)propyleneoxide groups and less than 5 wt %, preferably less than 3, 2 and most preferably 0 wt % relative to the total weight of the water soluble second polymer of ionic groups (the latter not including amine groups in non-ionic form).

The monomers in said water soluble second polymer are chosen in combination to achieve that the second polymer is sparingly watersoluble and has substantially Newtonian flow behaviour. Preferably, the monomers in said water soluble second polymer are non-ionic hydrophilic monomers A, preferably as herein described, optionally in combination with hydrophobic monomers B that are sparingly insoluble. Preferably the non-ionic hydrophilic monomers A are characterised by a Hoy solubility parameter of the corresponding homopolymer of said monomers larger than 20 and smaller than 30.0 $(J/m^3)^{1/2}$ and preferably an number average Hoy value of all monomers A between 20 and 24. The hydrophobic monomers B are characterised by a Hoy solubility parameter of the corresponding homopolymer of said monomers is larger than 16 and smaller than more preferably 24.0 $(J/m^3)^{1/2}$ and preferably an number average Hoy value of all monomers B between 16.5 and 21. Preferably, the second polymer has an overall Hoy solubility parameter larger than 21.0, preferably larger than 21.5 $(J/m^3)^{1/2}$ and lower than 24.0 preferably lower than 23.0.

The water soluble second polymers are dissolvable in water, but preferably only sparingly soluble such that it is close to being insoluble. The solubility in the aqueous solution to be used for mixing with the first polymer dispersion in the coating composition is primarily judged visually at room temperature at 25 C. When the aqueous solution of the second polymer has the appearance of a milky dispersion it is not acceptable, when it has only a slightly milky appearance it is borderline acceptable, when it has a slight haze it is acceptable and it is preferred that the water-soluble polymer is clear transparent. Preferably, no discrete particles can be measured with dynamic light scattering on a Malvern Zetasizer type F90.

According to the invention a high open time can be achieved in combination with a good early water resistance EWR of the resulting coating. A good open time of at least 10 min is achievable with a good early water resistance EWR of more than 3.0, more preferably more than 3.5, even more preferably more than four 4 (see experimental part). More preferably the open time is at least 12, 14, 15 min in combination with such good EWR. Good EWR is achieved by choosing an appropriate amount of hydrophobic monomers B, but also by choosing an appropriately low amount of second polymer in combination with the first polymer. For example, a water-soluble second polymer having a high solubility in water (average Hoy above 20 or 21) can be used in amounts less than 40, 30, 20 or 15 weight percent (on total solids) to achieve good EWR.

The water soluble second polymer is characterised by having a viscosity in a solution in water between 0.02 and 2,000 Pa·s at solids content of the second polymer ranging between 30 and 50, preferably 60 and more preferably 70 wt % when measured at 1 Pa shear stress and between 0.01 and 500 Pa·s when measured at 1500 Pa shear stress at the same solids content when measured at 1 Pa shear stress. Preferably the viscosity of the second polymer in a solution in water at a solids content of the second polymer in the range of 40-60 wt % is between 0.2 and 300 Pa·s measured at 1 Pa shear stress and of 0.1-50 Pa·s at 1500 Pa shear stress, more preferably the viscosity in a solution in water at the solids content of the second polymer in the range of 45-55 wt % solids of 1.0-20 Pa·s measured at 1 Pa shear stress and of 1.0-10 Pa·s at 1500 Pa shear stress.

The substantially Newtonian flow behavior characteristic is reflected by the flow rheology diagrams and can be expressed in the pseudoplasticity factor PPF defined as the viscosity at shear stress at 1 Pa divided by the viscosity at shear stress at 1500 Pa as determined in a shear stress flow measurement of an aqueous solution of the second polymer at the given solids content at room temperature (23° C.) using a Physica RC310 viscometer with cone and plate configuration using a cone CP-50-1, 50 mm diameter having an angle of 1.0°. Ideally in pure Newtonian flow the PPF is 1. The second polymer has substantially Newtonian rheology characterised by a pseudo plasticity factor PPF of an aqueous solution comprising 50 wt % of the second polymer is lower than 3.0 preferably lower than 2.0, more preferably lower than 1.5 and most preferably lower than 1.2. in case the second polymer is prepare at by the solvent method the PPF is determined on second polymer aqueous solution also comprising the water-soluble organic co-solvent. Typically a mixture of water and watersoluble cosolvents like DEGME (see examples) in a ratio of 99/1 to 60/40.

Evidently, during drying of a coating the concentration of the water-soluble second polymer in the aqueous phase increases and the measured PPF at higher concentrations may be higher. However, it is preferred the PPF of a solution of 60 wt % of the second polymer in water is lower than 5.0, preferably lower than 3.0, most preferably lower than 2.0. Such PPF is very low for a polymer solution of 60 wt %. Reversely, the PPF at lower amounts will be lower and preferably, at 40 wt % of the second water-soluble polymer in only water the PPF is lower than 2.0, preferably lower than 1.5, most preferably lower than 1.2.

This water soluble second polymer causes the liquid phase of the coating composition to be still substantially Newtonian but with a much higher viscosity than without this water soluble second polymer. In fact it is a Newtonian thickener, using however a completely different mechanism. Due to the higher viscosity of the liquid phase and the fact that during drying this viscosity increase develops with a lasting low PPF, the water soluble second polymer additive allows the wet paint films to flow longer and have a longer open time.

The build in Newtonian character of the coating composition stays during the largest part of the drying of the coating leading to open times, gloss and flow more similar to solvent borne paints and alongside profit from the fast drying and hardness build up during drying.

Additionally, the second polymer acts as an effective coalescing agent and less co-solvents are needed since the water soluble second polymer is auto-plasticized by the water which also allows to achieve lower VOC. Prior art open time improving additives as discussed above may have Newtonian character but all lead to unacceptable water resistance of the cured coating since these polymers or additives are either too soluble in water or have very high molecular weights and are not highly compatible with the first polymer and are not capable to coalesce or mix in the hydrophilic first binder. This leads to unacceptable disadvantages in the resulting cured coating properties and therefore such additives can only be used in very small amounts which limits possibility to achieve open time improvement.

Use of the Water Soluble Second Polymer

The invention also relates to novel water-soluble polymer as described above in any of the embodiments and to the use thereof in an aqueous coating composition for increasing at least one of the properties of open time, wet edge time, drying properties of the aqueous coating composition or gloss, water resistance or hardness of the resulting coating comprising one or more film forming polymers, in particular for use in aqueous dispersion or emulsion coating compositions, more in particular for use in any of the aqueous coating compositions herein described, more in particular for use in an aqueous coating composition comprising a dispersion in water of a film forming polymer binder in an amount ranging between 10-90, preferably 30-70 wt % (relative to total weight of the composition) wherein the amount of second polymer is between 0.2 and 40, preferably 0.5-25 wt % relative to the total of the polymer binder and the second polymer. Further, the invention relates to the use of the water-soluble second polymer as described herein as a coalescence agent in an aqueous coating composition.

Process for the Preparation of the Water Soluble Second Polymer

The water soluble second polymer is an addition polymer and can be made by polymerisation techniques known in the art at atmospheric or elevated pressures at temperatures ranging between 0 and 200 C. A general method is described in the BASF U.S. Pat. No. 4,816,543:

The water soluble second polymer can be polymerised from a homogeneous mixture of all monomers A-F or can be polymerised in two or more subsequent steps in different polymerisation conditions or with different monomer mixtures. However, it is preferred that the second polymer is a random copolymer prepared from a monomer mixture. Blockcopolymer or gradient copolymers wherein the pendant groups from monomers A are not uniformly distributed in the second polymer are not preferred as they are suspect to not form water-soluble substantially Newtonian solutions.

In a process, referred to as the "distillation process", the polymerisation is performed in an easily distillable solvent like methyl ethyl ketone, acetone or iso-propanol until the polymer is formed to an acceptable conversion of the free monomers. Subsequently, the solvent is distilled followed by addition of water or distilled during water addition. The last option is preferred when a higher molecular weight is made. Examples of the water soluble second polymer using this process are described below.

In a process, referred to as the "solvent process", the polymerisation uses a water soluble cosolvent as start in the reactor and/or as diluent of the monomers and initiator during dosing. When polymerisation is finished it may be distilled as described above or may stay in the second polymer and functions in the paint formulation as cosolvent; examples are butylglycol, diethyleneglycol mono butyl ether or diethylene glycol mono ethyl ether. Examples of the water soluble second polymer using this process are described below. In the preparation processes no surfactants are used.

Background Prior Art Relating to the Watersoluble Second Polymer

U.S. Pat. No. 3,736,286 describes water soluble copolymer of N-vinyl pyrrolidone (55-95% by wt.) and ethyl acrylate (45-5% by wt.) for use as emulsifier or thickener. NL6501031 describes polymers based on vinyl pyrrolidone which are water-unsoluble polymers and comprise only 5 to 15% by wt. of N-vinyl-2-pyrrolidinone and 95 to 85% by wt. respectively of hydrophobic monomers for use in leather and wood-coatings and for preventing tannin bleeding. There is no mentioning of use in coating compositions for improving wet edge or open time.

WO2010/133527 describes aqueous coating compositions comprising a first polymer binder and watersoluble copolymers comprising hydrophobic (0.1-20%) and hydrophilic monomers (25-99.9%) based on methoxy-polyethyleneglycol methacrylate as thickener or surfactant and which may optionally comprise N-vinyl-2-pyrrolidinone and ethylacrylate.

DE3627969 describes polymers based on ethylacrylate/Vinylpyrrolidone/t-Butylacrylamide for use in hair spray. U.S. Pat. No. 497,930 and U.S. Pat. No. 293,173 describe similar polymers for use in safety glass and in adhesives respectively.

U.S. Ser. No. 11/907,906 and U.S. Pat. No. 7,851,568 describe coating compositions comprising vinylpyrrolidone/hydroxymethylacrylate as the film forming polymer binder to crosslink with melamines at elevated temperatures.

U.S. Pat. No. 4,816,534, U.S. Pat. No. 7,629,425 and, U.S. Pat. No. 5,122,582 describe methods that can be used to prepare the second water soluble polymer. In particular using isopropanol as solvent in order to get water clear solutions followed by evaporating the isopropanol. Pendant (N) amide copolymers are mentioned using vinylpyrrolidone, N-vinyl-lactam and vinylacetate. U.S. Ser. No. 11/907,906 and U.S. Pat. No. 7,851,568 describe methods of preparation op (N)amid copolymers specifically containing HE(M)A for use as ion exchange polymer.

U.S. Pat. No. 6,866,936 describes a water-based coating composition which includes a supporting polymer (e.g.; a polyurethane) emulsified in aqueous medium and a hydrophilic polymer which, in a coating, swells in the presence of water to provide a "slippery" or lubricious coating surface. Poly-vinyl pyrrolidone is mentioned. The prior art coatings are cured at elevated temperatures between 70 and 160° C.

U.S. Pat. No. 7,008,979 describes an aqueous coating composition for providing a surface with a hydrophilic coating that has good adhesion, lubricity, water and blood adsorption, said composition comprising a hydrophilic modified polyurethane carrier dispersed in water and a hydrophilic water soluble polymer derived from N-vinylpyrrolidone, a colloidal metal oxide and a crosslinker. Only N-vinylpyrrolidone homopolymers are described.

DE 10106567 describes an aqueous dispersion comprising dispersed particles with a particle diameter ≤500 nm preparable by free-radical micro- or miniemulsion polymerization of at least one olefinically unsaturated monomer in the presence of at least one hydrophobic additive and further comprising at least one oligomeric polyester with a high hydroxyl number of from 100 to 1000 mg KOH/g which is believed to reduce haze and turbidity in clear coatings and have good dispersion stability.

The prior art does not disclose the presence in a coating composition of a second polymer that is borderline water soluble and is a copolymer composed of specified hydrophilic monomers A, for example N-vinylpyrrolidone, in combination with specified hydrophobic monomers B and does not disclose its use in water borne coating compositions, in particular in ambient temperature curable water borne coating compositions, for improving open time and wet-edge time and also good compatibility of first and second polymer and good water resistance of the resulting coating.

The Film Forming First Polymer

The term film-forming means that the first polymer is the majority polymer component constituting the film or coating and determining the properties thereof and typically the film forming polymer is hydrophobic by nature for water resistance of the coating. In the aqueous coating composition according to the invention the one or more film-forming first polymers are preferably selected from the group consisting of vinyl-, polyurethane-, polyurea-urethane-, polyester-, alkyd- and epoxy polymers and hybrids or blends thereof.

The coating compositions may be crosslinkable (curable) or non-crosslinkable. Preferably, the coating composition is ambient curing. Ambient curing is defined as being crosslinkable (curable) in the temperature range of 5 to 50° C. and the first polymer comprises crosslinkable groups that react in that temperature range. In a preferred embodiment the first polymer can be a vinyl polymer bearing carbonyl groups for cross-linking with a carbonyl reactive cross-linker.

The first polymer can also be an auto-oxidisable self-crosslinking organic polymer containing unsaturated fatty acid residues or (meth)acryloyl modified monomers, preferably an auto-oxidisable polyurethane. In a particular embodiment the first polymer is an alkyd emulsion or urethane modified alkyd emulsion. The auto-oxidative crosslinking can be catalysed by metal catalysts such as iron, manganese or cobalt complexes.

Preferred first polymers that profit from the improved open time and wet edge are aqueous vinyl polymer dispersions aqueous alkyd emulsions, aqueous polyurethane dispersions and mixtures thereof. The compositions may be 2K crosslinkable compositions, but preferably are self-crosslinkable or non-crosslinkable ambient curing coating compositions.

Typically the film-forming first polymers are polymers have a weight average molecular weight Mw between 2000 and 2,000,000 gr/mole (determined by gel permeation chromatography using hexafluoro-i-propanol as eluent and using PMMA standards) or are crosslinked polymers and have a glass transition temperature Tg of from −30 to 80° C., preferably 0 to 45° C., more preferably 0 to 25° C. Examples of suitable film forming first polymer aqueous dispersions are those wherein film forming first polymer is a vinyl polymer, polyurethane or alkyd or combinations thereof. The first polymer preferably is an self-crosslinkable alkyd or a crosslinkable vinyl polymer or polyurethane comprising crosslinkable groups in an amount such that the first polymer has an equivalent weight per crosslinking group between 2000 and 5000 gr/eq (on solid polymer).

Particular examples of such first polymer dispersions are self cross linking acrylic dispersions such as described in EP 0927198 and EP 1125949. Commercially available self-cross linking acrylic dispersions are Setaqua 6776, Setaqua 6784, Setaqua 6782, Setaqua 6756 available from Nuplex resins or NeoCryl XK-98 available from DSM Coatingresins. The described self crosslinking acrylic dispersions have an equivalent weight of functional moiety between 2,000 and 5,000 g/eq (on solid polymer).

Examples of polyurethane or a polyurethane-acrylic hybrid dispersions include the binders described in WO2010/066902. A polyurethane dispersion that is particularly suited to use in the present invention is fatty acid modified to provide an auto-oxidisable cross linking polymer and is described in WO2007/131959. An example of such a polymer is Setaqua X11712 (named in the examples 1$^{st}$ polymer 1, commercially available from Nuplex Resins BV). An example of a urethane-acrylic hybrid polymer dispersion is Rhodasol F115 and F125 also available from Nuplex Resins.

Suitable alkyd emulsions are generally prepared by preparing an alkyd binder by conventional polycondensation methods and emulsifying said binder in water afterwards. The hydrophilic groups needed to stabilize the alkyd particles in the aqueous phase can be ionic or non-ionic and can be introduced by the use of conventional surfactants or by modifying the alkyd during or after the synthesis with stabilizing groups. An example of such a polymer is Uradil AZ 554 Z-50, an alkyd dispersion ex DSM Coatingresins or Dynotal LS82 ex Dyno ASA. Optionally, the alkyd emulsions are modified with di- or polyisocyanates prior or after emulsification. Alkyd emulsions thus modified have the advantage of drying faster than non-isocyanate modified alkyd emulsions. Examples of such products are Worléesol 150 E from Worlée, Setaqua 6002 and Setaqual 6004 ex Nuplex Resins. Blends of the polymer dispersions mentioned above can be used as well to make up the coating composition of the invention.

The first polymer dispersions mentioned above have excellent drying properties, chemical and water resistance and favorable mechanical properties such as hardness, adhesion, block and scratch resistance but coating compositions based on these binders alone typically suffer from a short open or wet edge time.

The Aqueous Coating Composition

The aqueous coating composition according to the invention preferably comprises: a) 60-99.8 wt %, preferably 75-99.5 wt %, more preferably 80-99.5 wt % of the one or more film forming first polymers relative to total weight of the first and second polymers, and b) 0.2-40 wt %, preferably 0.5-25 wt % more preferably 0.5-20 wt % of one or more second polymers. An aqueous coating composition having only the first and second polymers can be further formulated to a paint composition by adding the usual paint additives for example for curing, color and coating properties like stability, optical, chemical and mechanical properties.

The aqueous coating composition preferably comprises 80-20 wt % water relative to the total weight of the aqueous coating composition, 20-80 wt % of one or more first and one or more second polymers, 0-30 wt % water miscible organic co-solvent, 0-30 wt % coating additives, the sum of a-d being 100 wt %. The coating composition preferably comprises less than 20 wt % volatile organic solvent, preferably less than 15, 10 or 5 wt % and most preferably less than 2 wt % wherein wt % is relative to the total weight of the coating composition.

The coating composition can have a pH between 2.0 to 9.0, preferably 4.5 to 8.5, most preferably 7.5 to 8.0. Preferably, the pH of the first polymer dispersion is from 4.5 to 8.5, most preferably from 7.5 to 8.0 when mixed with a water soluble polymer comprising tert-amine groups or a solution thereof, in view of keeping possible ionic groups, in particular t-amine groups, neutral. Advantageously, colloidal stability of the first and second polymers is not susceptible to big pH differences between first and second polymer since the second polymer does not need and preferably does not have substantial amounts of ionisable groups such as amine and carboxylic acids.

The coating composition described above is formulated to a paint by adding the usual paint additives. Such composition can still be referred to as a coating composition. The waterborne coating composition may further comprise one or more organic solvents that aid film-formation, a pigment (organic or inorganic) and/or other additives and fillers known in the art. When an organic solvent is used, water miscible solvents are preferred. The amount of organic solvent shall be chosen in such a way to provide a coating composition with a low volatile organic content (VOC), and preferably comprises less than 50 g/liter, preferably less than 30 g/(liter coating composition including water) of volatile organic compounds, as calculated by ISO method 11890-2 in the ready to use form.

Examples of coating additives include, but are not limited to, leveling, rheology, anti-block, and flow control agents such as silicones, fluorocarbons, urethanes, or cellulosics; extenders; flatting agents; pigment wetting and dispersing agents and surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; or coalescing agents. The invention also relates to a paint composition comprising the coating composition and 1-70 wt % pigment or filler. The coating composition according to the invention may further comprise: up to 20 wt % preferably up to 15, 10 or 5 of isocyanate crosslinker; up to 20 wt %, preferably up to 5 of polyhydrazide cross linker; up to 10 wt % of a silane cross linker; up to 10% of an (meth-)acryloyl oligomer.

As mentioned earlier the coating compositions in accordance with the present invention are suitable for a variety of coatings uses, for example, as paint, impregnating, sealing and bonding compositions. A preferred application is as a primer, topcoat, or clearcoat. The coating compositions may be applied to a substrate in any convenient manner such as, for example, by brushing, spraying or dipping. Suitable substrates include metals, wood, board, plastics and leather. The first polymer according to the invention provides i.a. good open time whereas articles coated with the coating or paint composition after curing have excellent coating properties.

Method for the Preparation of a Coating Composition

The invention also relates to a method for the preparation of a coating composition according to the invention comprising mixing an aqueous dispersion of the first polymer having a first polymer content between 60 and 99.8 wt %, preferably 75 to 99.5 wt % (relative to the total weight of said aqueous dispersion) with an aqueous solution of the water soluble second polymer having a second polymer content of 0.2 to 40 wt %, preferably 0.5 to 25 wt % (relative to the total weight of said aqueous solution). Preferably in the method the aqueous dispersion of the first polymer and the aqueous solution of the second polymer have a pH between 4.5 to 8.0, preferably 6.5 to 8.0 when being mixed together, in particular when the second polymer comprises amines. Preferably the second polymer solution in water is added to the first polymer aqueous dispersion or visa versa by slow dosing and stirring at ambient temperatures preferably between 20 and 40° C.

In a preferred method for the preparation of the coating composition, the one or more first and one or more second polymers are preferably blended before preparation of the paint formulation in order to form a stable (hybrid) binder. Preferably one or more second polymers or a solution thereof are carefully added at ambient temperature to a dispersion of one or more first polymers in 0.5 to 5 hours depending on the stability/compatibility of the first polymer dispersion towards the second polymer. Addition of the first polymer to the second polymer is not preferred for similar stability reasons. Advantageously, colloidal stability of the second polymers allows blending with first polymers having a wide range of pH (pH between 2.0 to 9.0, preferably 4.5 to 8.5), since the second polymer does not need and preferably does not have substantial amounts of ionisable groups such as amine and carboxylic acids.

The inventors have found that a coating composition according to the invention when compared to coating composition with one or more first polymer and without the second polymer:

a) a reduction of Newtonian thickener can be obtained of 25 to 50%,
b) an increase of gloss can be obtained of 10 to 50%,
c) an increase of hardness can be obtained of 25 to 50% of the Koenig hardness, measured on films with an applied layer thickness of 80 um and measured after 1 day drying at ambient temperature,
d) an increase of dry speed can be obtained of 25 to 50% for dust dry and tack free drying,
e) a reduction of cosolvent for good film formation or coalescence can be obtained of 25 to 70% for a given film hardness or Tg,
f) reduction of VOC's to a range of 20-40 g/(ltr coating composition including water)
g) an increase of chemical resistance, preferably handfat resistance from acceptable to excellent,
h) good water resistance one day after application as clear coat at 23 t and 50-60% relative humidity and
i) compatibility with the first polymer being stable for 2 months stored at 50° C.

Definitions and Measurement Methods

The solids content is measured by applying 1 gram of resin on a tin-cup and, after weighing the amount of resin, putting the cup into an air circulated oven for 60 minutes at 125° C. The difference in weight relates to the volatile content and the remaining non-volatile part is the solids content. If the viscosity is high 1 gram of water is added before heating. The 2nd polymers prepared with the "water process" contain DEGME or other co-solvent. In this case the method described does not afford proper solids contents values. As a consequence the theoretical solids content is used. The correctness of this value was checked afterwards, using the Karl Fischer measurement of the water. Assuming no loss of the used co-solvent (e.g. DEGME), those skilled in the art can easily calculate the solids content.

The molecular weight was measured by GPC in tetrahydrofuran+2% Acetic acid. Polystyrene standards are used from Polymer Laboratories, Easical PS-1, 2010-0501 (M range 580 g/mol-8.500.000 g/mol) and Easical PS-2, 2010-0601 (M range 580 g/mol-400.000 g/mol). Sample preparation by dissolving and filtering in eluent. This method was used in the case of all NNDMA based $2^{nd}$ polymers. In all other compositions hexafluoro isopropanol with 0.02 M potassium trifluoroacetate (HFIP+0.02M PtFAc) was used as eluent. Polymethylmethacrylate standards are used with M range 505 g/mol-2.740.000 g/mol). Sample preparation by freeze drying of dried film in order to remove all water, followed by dissolving in the eluent. The molecular weights are expressed in g/mol. A Waters 410 was using refractive index RI detection (temperature. 30° C. for THF and 35° C. for HFIP)

The open time of the paint was determined by applying it onto a Leneta plain chart FORM WH with a bar applicator at 125 microns in climatised conditions: at 23 t at 45-55% relative humidity. The evaporation speed of the waterborne paints is 22 mg/m$^2$/sec. Using the rubber eraser of a pencil with a width of at least of 2 mm, X-shaped crosses are being applied into the paint layer immediately after if has been applied. A brush (Elma acryl 93-14 or Pro-Gold Exclusive 7200-12) loaded with fresh paint and the excess paint is removed by scraping alongside the edge of the can. The fresh loaded brush is moved twice in the vertical direction of the width of the substrate and twice in the horizontal direction of the length of the substrate at the location of the X-shaped cross. This movement is repeated 10 times on the same cross ("10 cross-brushes"). This procedure is repeated after a one or two-minute interval on the next cross, until the cross stays visible even after 10 "cross-brushes" (one movement=twice in the direction of the width of the substrate and twice in the direction of the length of the substrate). The open time is reported as the time in which the X-cross shape damage in the fresh applied film can be completely removed after 10 "cross-brushes" within the next interval of 1 or 2 minutes. 2 minutes intervals may be chosen to get a first indication of the open time; more accurate open time measure is followed by taking 1 minutes intervals.

Early Water Resistance EWR is measured by applying a 80 μm wet film on Leneta plain charts. After drying for 24 hrs at 23° C. at 45-55% relative humidity a 3 droplets of water are put on the surface of the paint and left for 0.5, 1 and 2 hrs. After this time the water is removed with cloth. The damage in the form of blisters is judged directly and after 24 hrs recovery. The reported EWR is the one of 1 hr water contact and 24 hrs recovery. A scale of 1 (completely removed or fully blistered) to 5 (no damage) is used.

Viscosity and flow curves were measured on an Physica MSC310 Rheometer (Anton Paar)/RHEOPLUS/32 V3.30 or TA Instruments AR 2000 rheometer using the cone and plate configuration (cone 4 cm, 1° angle) at 23° C. Upward and downward curves are measured going from 1,500 to 0.1 Pa, respectively from 1.500 to 0.1 Pa shear stress. The downward curve is used to extract by extrapolation between the 2 closest values, the viscosity values ETA (Pa·s) at 1 and 1,500 Pa. Various solids content (SC) levels (i.e. second water soluble polymer content) were prepared for measurement of the ETA/SC curves by diluting the second polymer in water to lower solids contents or to higher solids content by evaporation of a wet film on a A4 shaped glass plate with a 125 μm wet film to the envisaged solids content. The film is scraped of and the flow curve is measured with the obtained sample. After measurement of flow curve the solids content is obtained of remaining sample.

Analysis of the conversion in the polymerisation is done by measurement of monomers by HPLC after dilution of the sample in acetonitrile. 1000 mg sample is dissolved in 9 ml acrylonitrile. Subsequently 1 ml of saturated potassium chloride is added. The solution is filtrated over a 0.2 μm filter and ready for analysis. An Acquity UPLC (Ultra performance liquid chromatography) BEH (bridged ethylene hybrids, Waters®) C18 1.7 is used and gradient elution with Reservoir A: Water+0.1% $H_3PO_4$ and reservoir B: Acetonitrile+0.1% $H_3PO_4$.

Abbreviations Used in the Examples

| | |
|---|---|
| AA | acrylic acid |
| AMBN | 2,2'-azo bis(2-methylbutyronitril) |
| BDG | butyldiglycol |
| BMA | butyl methacrylate |
| DAAM | diaceton acryl amide |
| DEGME | diethylene glycol monoethyl ether |
| DPM | Dowanol PM ® |
| DPM | 1-methoxy-2-propanol (Dowanol PM ®) |
| EA | ethyl acrylate |
| ETA or η | Viscosity or η |
| EWR | Early water resistance |
| HEA | hydroxyethyl acrylate |
| Hexasol | 2-methyl-2,4-pentanediol |
| HFIP | hexa Fluoro Iso Propanol) |
| IPA | iso-propanol |
| KH | Koenig Hardness |
| Log | Logaritm |
| MAA | methacrylic acid |
| MADAME | 2-dimethyl aminoethyl ethaerylate |
| ME | 2-mercapto ethanol |
| MEK | methyl ethyl ketone |
| MMA | methyl methacrylate |
| Mn | number average molecular weight |
| MPEGMA | methoxy polyethyleneglycol methacrylate 550 |
| Mw | weight average molecular weight |
| nm | not measured |
| NNDMA | N,N-dimethyl acrylamide |
| OX | Oxfilm 351 ® OXEA |
| Pa | Pascal |
| Pa · s | Pascal seconds |
| PEG | Polyethylene glycol |
| PH | Persoz Hardness |
| PMMA | Polymethylmethacrylate |
| Pol | polymer |
| PPF | pseudoplasticity factor |

-continued

| | |
|---|---|
| PVP | Polyvinyl pyrrolidone |
| SC | solids content (wt %) unless otherwise mentioned |
| Sty | styrene |
| THF | tetra hydrofuran |
| VCL | (N)-vinyl caprolactam |
| VI | (N)-vinyl imidazole |
| VP | (N)-vinyl pyrrolidone |
| WS | water soluble |
| Wt % | weight percentage |
| WTC | white top coat paint formulation |

EXAMPLES

The following is a description of certain examples of the invention, given by way of example only. The methods for preparation of the first polymer, second polymer, coating composition and paint are described followed by a selection of examples of second polymers in Table 2 and paints in Table 3.

Preparation of the First Polymer

First polymer 1 concerns an auto-oxidatively drying polyurethane and is prepared as described in example 1 of patent application EP6113887. It is incorporated as first polymer 1 entirely. The properties of the polyurethane dispersion: Solids content 44%, pH 6.7, viscosity (at 23° C.) 0.7 Pa·s, particle size (Z-average mean, Malvern Autosizer) 159 nm, acid value on solids 24.3 mg KOH/g, number average molecular weight Mn: 3,710, weight average molecular weight Mw: 36,700 (GPC, polystyrene standards and THF+ acetic acid as eluent).

First polymers 2-5 concern respectively the commercial products Setaqua® 6756, 6776, 6782 and 6784. As illustration the viscosity values and PPF of the "true" pseudoplastic polymer emulsion—first Polymer 1—and dispersion—Setaqua 6756—discrete particles are shown.

| SC (%) | η 1 Pa (Pa · s) | η 1,500 Pa (Pa · s) | PPF |
|---|---|---|---|
| first Polymer 1 | | | |
| 45 | 1.789 | 0.035 | 51 |
| 45 | 1.803 | 0.048 | 37 |
| 45 | 98 | 0.211 | 467 |
| 45 | 431 | 0.402 | 1069 |
| Setaqua 6756 | | | |
| 40 | 19.14 | 3.327 | 5.8 |
| 40 | 4.58 | 0.523 | 8.8 |
| 40 | 241.18 | 19.223 | 12.6 |
| 40 | 10.79 | 0.351 | 30.7 |

Preparation of Second Polymer, Method A: Solvent Process

In a reactor solvent and demineralized water is added (A) and heated to the fixed temperature that is kept the full reaction time, subsequently the monomers emulsified in water are dosed in the reactor in 3 hours (B). Dosing vessel is cleaned with demineralized water (C). After 1 hour extra initiator solution (D) is added followed by rinsing of the vessel with (E). Depending on the conversion of the used monomers several boosts are performed with initiator and solvent (F) (n is in most cases 2 to 3). When finished the resin has a solids content of 40-45% and contains 15-20% of solvent which is not removed. In case of the solvent process, the PPF is determined on the aqueous solution of the second polymer including the organic solvent used in the process.

Only resins with a reasonable flat flow curve measured at increasing solids content (2 to 4 measurements during evaporation of a drying film are done, see given examples) are useful to blend with the main waterborne binder.

Preparation of Second Polymer, Method B: Distillation Process

In a reactor solvent(s) is added and heated to reflux temperature T1 that is kept during dosing of the monomers and initiator. Both the initiator solved in solvent—and the monomers in solvent—are dosed simultaneously in the reactor in 3 hours. Dosing vessel is cleaned with solvents (D and E). After given time in hours distillation is started until a reflux temperature is reached. Then 1-3 times extra initiator solution (F, G, H) is added followed by rinsing of the vessel with (I). The number of "boosts" is depending on the conversion of the used monomers (n is in most cases 2 or 3). When finished the resin is thinned with water (J) until the desired theoretical solids is reached.

Preparation of the Second Polymer Examples 1-20

Differences in process type, monomer composition and resulting polymer properties are depicted in Table 2 for 20 different second polymers. Second polymers 3, 7 and 13 are comparative because they have too high or too low amount of monomer B (second polymer 3, 7 resp.) or a too high amount of polyethylene glycol (second polymer 13). Of several examples full description of the synthesis and viscosity/solids contents/corresponding PPF's and/or ETA/SC data is given below.

Table 5 lists paint examples including Paint D as comparative example of a prior art second polymer (dispersion polymers) for improving open time that do not fulfil the close to Newtonian flow behaviour. Example 1 from patent application WO2012/130817 describes the preparation of aqueous polymeric vinyl dispersion polymer having both ethylene oxide and carboxylic acid functionality (in Table 3) and is an emulsion polymer based on MMA, MAA, MPEGMA, BMA and ME having 42% solids and a particle size of 110 nm.

It should be noted that the mentioned PPF's in the examples may be lower than 1.00. In most cases this is found at lower solids content and low viscosities (<0.1 Pa·s) where the limited accuracy of the measurement may lead to PPF below 1.0.

TABLE 2

Second polymer preparation

| 2nd Pol | A (%) | B (%) | C (%) | D (%) | I (AMBN) (%) | CTA (ME) (%) | COND |
|---|---|---|---|---|---|---|---|
| 1 | NNDMA 34.2 | MMA 11.2 EA 37.4 | DAAM 11.4 | MAA 3.9 | 1.03 | 0.96 | DIST |
| 2 | NNDMA 25.5 | MMA 13.2 EA 44.1 | DAAM 11.5 | MAA 3.9 | 1.03 | 0.77 | DIST |
| 3 | NNDMA 17.1 | MMA 15.2 EA 50.5 | DAAM 11.5 | MAA 3.9 | 1.03 | 0.77 | DIST |
| 4 | NNDMA 60.8 | BMA 25.7 | DAAM 9.9 | AA 1.3 | 1.00 | 1.31 | DIST |
| 5 | NNDMA 61.2 | BMA 25.8 | DAAM 10.0 | AA 1.3 | 1.01 | 0.78 | DIST |
| 6 | NNDMA 61.4 | BMA 25.9 | DAAM 10.0 | AA 1.3 | 1.01 | 0.39 | DIST |
| 7 | VP 100.0 Aldrich K60 | | | | | | |
| 8 | VP 79.9 | EA 20.0 | | | 0.18 | | DIST |
| 9 | NNDMA 62.8 | MMA 19.1 | DAAM 17.7 | | 0.50 | | DIST |
| 10 | MADAME 78.7 | EA 19.7 | | | 1.66 | | SP |
| 11 | VP 77.9 | EA 19.9 | DAAM 2.0 | | 0.12 | | SP |
| 12 | VP 79.1 | EA 10.0 | HEA 10.7 | | 0.17 | | DIST |
| 13 | VP 58.0 MPEGMA 41.9 | | | | 0.11 | | SP |
| 14 | VP 79.9 | EA 20.0 | | | 0.12 | | SP |
| 15 | VP 79.9 | EA 20.0 | | | 0.18 | | DIST |
| 16 | NNDMA 64.9 | EA 34.9 | | | 0.15 | | SP |
| 17 | VP 78.7 | EA 19.6 | | | 1.69 | | SP |
| 18 | VI 78.6 | EA 19.7 | | | 1.70 | | SP |
| 19 | VCL 79.3 | EA 19.8 | | | 0.92 | | DIST |
| 20 | MADAME 78.7 | EA 19.6 | | | 1.79 | | SP |

| 2nd Pol | SOLV (%) | TWM (g) | SC (%) | WS & N | Mw (g/mol) | Mn (g/mol) |
|---|---|---|---|---|---|---|
| 1 | MEK 85.8 | 520.9 | 42.3 | yes | 11,300 | 5,200 |
| 2 | MEK 86.2 | 483.8 | 42.3 | y/n | 13,900 | 6,100 |
| 3 | MEK 85.9 | 483.8 | 42.3 | no | 14,400 | 6,100 |
| 4 | MEK 100.2 | 908.3 | 42.3 | yes | 8,200 | 3,800 |
| 5 | MEK 100.8 | 402.4 | 42.3 | yes | 11,800 | 6,100 |
| 6 | MEK 101.2 | 401.6 | 42.3 | yes | 17,400 | 7,100 |
| 7 | H2O 80.0 | | | yes | 160,000 | nm |
| 8 | MEK 53.4 | 912.4 | 44.9 | yes | 51,600 | 18,400 |
| 9 | MEK 37.7 | 285.0 | 46.3 | yes | 41,900 | 17,900 |
| 10 | DEGME 55.4 | 398.7 | 40.7 | yes | 42,300 | 12,200 |
| 11 | DEGME 87.0 | 354.2 | 46.3 | yes | 114,000 | 53,000 |
| 12 | MEK 53.9 | 423.7 | 44.9 | yes | 57,000 | 19,300 |
| 13 | DPM 44.9 | 113.5 | 42.0 | no | nm | nm |
| 14 | DEGME 49.5 | 362.2 | 44.9 | yes | 152,000 | 67,100 |
| 15 | MEK 52.3 | 758.0 | 44.9 | yes | 52,900 | 12,200 |
| 16 | DPM 83.7 | 284.0 | 35.3 | yes | nm | nm |
| 17 | DEGME 53.3 | 347.2 | 40.6 | yes | 47,400 | 18,900 |

TABLE 2-continued

| | | Second polymer preparation | | | | | |
|---|---|---|---|---|---|---|---|
| 18 | DEGME | 55.6 | 399.4 | 40.6 | yes | 17,500 | 41,000 |
| 19 | MEK | 59.4 | 1216.8 | 45.4 | yes | 17,100 | 51,300 |
| 20 | DEGME | 55.7 | 398.9 | 40.4 | yes | 12,200 | 42,300 |

Table 2 comprises the following information on the second polymers (2nd Pol); the monomer composition (monomers A-D), amount of initiator AMBN (I), amount of chain transfer agent ME (CTA), process conditions (COND), wherein DIST means distillation process and SP means solvent process, solvents used in a weight % relative to 100% monomer (SOLV), total weight made or second polymer (TWM), solids content as used in the paint examples (SC), qualification whether the second polymer is water soluble and substantial Newtonian (WS & N; y/n means borderline) and weight and number average molecular weight (Mw and Mn).

FIG. 1 shows, as an illustration, the Flow curves of 2nd polymer 1 and 3, where 2nd polymer 1 is substantially Newtonian at 53.8% solids content (PPF at 53.8% SC=1.02) and 2nd polymer 3 (not according to the invention) is already pseudoplastic at 26.0% solids content (PPF at 40.0% SC=1.20). Both polymers have similar molecular weights (Mw 11,300 versus 14,400).

First polymers 1 to 6 are all based on NNDMA (from monomers A) and further contain MMA, BMA or EA (from monomers B), DAAM (from monomers C) and MAA or AA (from monomers D).

Example Second Polymer 1

Example second polymer 1 concerns the preparation of the second polymer by the "distillation process". In an emulsion polymerization reactor 410.0 grams of MEK is added and heated to reflux (86° C.). Then a mixture of 18.8 grams of MEK and 1.0 gram of the initiator Perkadox® AMBN is added in the reactor. The monomer solution was prepared by adding the following raw materials in the feed tank: 20.5 grams of MAA, 59.6 grams of DAAM, 178.0 grams of NNDMA, 58.3 grams of MMA, 194.2 grams of EA, 5.0 grams of ME and 4.38 grams of the initiator AMBN. Mix until a clear solution is obtained. The monomer solution is dosed to the reactor in 5 hours. During the polymerization the reflux temperature rises from 86 to 88° C. When dosing is finished a mixture of 18.0 grams of MEK and 0.48 grams of AMBN is dosed to the reactor in 30 minutes at 88° C. The reaction is continued for 1½ hours at 88° C. The mixture is cooled to 30° C. and vacuum distillation is started (100-50 mbar) and continued until all MEK is recovered (445.0 grams). Then 702.5 grams of demineralized water is dosed in 30 minutes in the reactor at 30° C. The resulting second polymer is a clear solution with a slight haze and has a solids content of 42.6%. It has a weight average molecular weight of 11,300 and a number average molecular weight of 5,200 g/mol. The viscosities (Pa·s) at 3 solids contents (%) and the PPF are shown below.

| SC | η 1 Pa | η 1,500 Pa | PPF |
|---|---|---|---|
| 29.0 | 0.073 | 0.073 | 1.00 |
| 40.4 | 0.435 | 0.425 | 1.02 |
| 53.8 | 2.965 | 2.927 | 1.01 |

Example Second Polymer 2

A similar second polymer 2 prepared with lower level of NNDMA (25.5%) is having good rheology but is not any more clear. Its appearance is slightly milky. It is considered bottom line in clarity however the viscosities (Pa·s) at 2 solids contents (%) and the PPF values are still at acceptable low as below.

| SC | η 1 Pa | η 1,500 Pa | PPF |
|---|---|---|---|
| 29.0 | 0.510 | 0.490 | 1.04 |
| 39.6 | 2.555 | 2.464 | 1.04 |

Example Second Polymer 3 (not According to the Invention)

A similar second polymer 3 prepared with only 17.1% NNDMA (shown in series 1 as second polymer 3) is not according to the invention because it is a classical milky dispersion polymer having higher PPF values at substantially lower solids content (%) (FIG. 1 clearly shows the pseudoplasticity).

Second polymers 7-12 describe variations in hydrophilic monomers A and hydrophobic monomers B.

Example Second Polymer 4

Example second polymer 4 concerns the preparation of the second polymer by the "distillation process" using NNDMA as monomer A, BMA as monomer B, DAAM as monomer C and AA as monomer D.

Example Second Polymer 5

Example second polymer 5 concerns the preparation as second polymer 4 but with a higher molecular weight.

Example Second Polymer 6

Example second polymer 6 concerns the preparation as second polymer 4 but again with a higher molecular weight.

Example Second Polymer 7

Is the commercial PVP K60 (Aldrich®) used as model compound. It is fully water soluble clear solution and substantially Newtonian in rheology. Viscosities and PPF,

| SC | η 1 Pa | η 1,500 Pa | PPF |
|---|---|---|---|
| 20.0 | 0.304 | 0.229 | 1.32 |
| 30.0 | 2.18 | 1.71 | 1.27 |
| 45.0 | 59.5 | 48.1 | 1.23 |
| 50.0 | 150 | 119 | 1.26 |

Example Second Polymer 8

Example second polymer 8 concerns the preparation of the second polymer by the "distillation process", as described for second polymer 12, using VP as monomer A and EA as monomer B. Part of monomer A is preloaded—as described in example second polymer 12—in the reactor before dosing the other monomers. The resulting second polymer has a solids content of 57.9% based on Karl Fischer measurement of the water content, a weight average molecular weight of 18,400 and a number average molecular weight of 50,400 g/mol. Viscosities and PPF,

| SC | η 1 Pa | η 1,500 Pa | PPF |
|---|---|---|---|
| 30.0 | 0.102 | 0.105 | 0.96 |
| 37.0 | 0.287 | 0.291 | 0.98 |
| 44.2 | 0.895 | 0.897 | 1.00 |
| 58.0 | 12.000 | 11.500 | 1.04 |

Example Second Polymer 9

Example second polymer 9 concerns the preparation of the second polymer by the "distillation process" as described for a second polymer 1 using NNDMA as monomer A, MMA as monomer B, DAAM as monomer C and no ionic monomers D. This results a second polymer as clear solution with a slight haze and has a solids content of 45.6% It has a weight average molecular weight of 41,900 and a number average molecular weight of 17,900 g/mol. Viscosity and PPF,

| SC | η 1 Pa | η 1,500 Pa | PPF |
|---|---|---|---|
| 45.6 | 11.52 | 9.73 | 1.18 |

Example Second Polymer 10

Example second polymer 10 concerns the preparation of the second polymer by the "solvent process" as described for second polymer 14 using MADAME as monomer A, EA as monomer B, no monomers C and no ionic monomers D. This results a second polymer as clear solution with a slight haze and has a solids content of 40.7% It has a weight average molecular weight of 42,300 and a number average molecular weight of 12,200 g/mol.

Example Second Polymer 11

Example second polymer 11 concerns the preparation of the second polymer by the "solvent process" as described for second polymer 14 using VP as monomer A, EA as monomer B, DAAM as monomer C and no ionic monomers D. This results a second polymer as clear solution with a slight haze and has a solids content of 46.3% It has a weight average molecular weight of 114,000 and a number average molecular weight of 53,000 g/mol. Viscosity and PPF,

| SC | η 1 Pa | η 1,500 Pa | PPF |
|---|---|---|---|
| 42.3 | 17.35 | 15.07 | 1.15 |

Example Second Polymer 12

Example second polymer 12 concerns the preparation of the second polymer by the "distillation process" using VP as monomer A, EA as monomer B. HEA as monomer C. Different from example 1 only in predosing of monomer A. Part of monomer A is preloaded in the reactor before dosing the other monomers.

In an emulsion polymerization reactor 226.4 grams of MEK and 32.5 grams of VP were added and heated to reflux (86° C.). The monomer solution was prepared by adding the following raw materials in the feed tank: 312.8 grams of VP, 42.3 grams of EA, 45.3 grams of HEA and 0.73 grams of the initiator AMBN. Mix until a clear solution is obtained. The monomer solution is dosed to the reactor in 2 hours. During the polymerization the reflux temperature rises to 88° C. When dosing is finished the reaction is continued for 1 hour at 88° C. and then cooled to 37° C. Subsequently 397.7 grams of demineralized water is added. The distillation is started and a MEK/water mixture is distilled off at 39° C. under reduced pressure (100-80 mbar). Then the necessary amount of water to dilute the resin to the theoretical solids content of 39.2% is added, based the sum of distillates. Yield of solid materials is 325 grams; yield of liquid materials is 555 grams. The resulting second polymer is a clear solution with a slight haze and has a solids content of 38.5% and a weight average molecular weight of 57,000 and a number average molecular weight of 19,300 g/mol. The resin has a hydroxyl value of 50.2 mg KOH/3.0% OH on solids. Viscosities and PPF,

| SC | η 1 Pa | η 1,500 Pa | PPF |
|---|---|---|---|
| 19.7 | 0.026 | 0.027 | 0.98 |
| 30.0 | 0.119 | 0.115 | 1.03 |
| 38.5 | 0.411 | 0.402 | 1.02 |

Example Second Polymer 13 (not According to the Invention)

Example second polymer 13 concerns the preparation of the second polymer by the "solvent process" using VP and MPEGMA (550) as monomers A. This results a second polymer as milky dispersion thus not fulfilling the invention. It has a solids content of 42.0%. MPEGMA 550 contains 12 Ethyleneoxide (EO) molecules, hence 84% EO. Polymer 13 therefore contains 35% EO (not according to the invention).

Third series polymers 13-17 describe second polymers with different molecular weights and process conditions.

Example Second Polymer 14

Example second polymer 14 concerns the preparation of the second polymer by the "solvent process" using same ratios VP as monomer A to EA as monomer B as second polymer 8, but lower weight of initiator I was used leading to higher molecular weight second polymer. In an emulsion polymerization reactor 179.2 grams of DEGME and 14.5 grams of VP are added and heated to 91° C. The monomer pre-emulsion was prepared by adding the following raw materials in the feed tank: 315.1 grams of demineralized water, 275.0 grams of VP, 72.3 grams of EA and 0.42 grams of AMBN. Emulsify the feed until a stable pre-emulsion was obtained. The monomer emulsion is dosed simultaneously to the reactor in 3 hours at a temperature of 91° C. The dosing vessel of the monomers is rinsed with 15.2 grams of demi water, the initiator vessel with 3.1 grams of DEGME. During the polymerization the temperature is 98° C. After the dosing the reaction is continued for 2 hrs and the resin is cooled and a clear solution with a slight haze is obtained. The resulting second polymer has a theoretical solids content of 42.3%, a weight average molecular weight of 152,000 g/mol and a number average molecular weight of 67,100 g/mol. The viscosity and PPF are shown below and show a higher PPF of 1.31 at 42.3% solids than earlier shown examples: this believed to be caused by the substantially higher molecular weight when compared to second polymer 8. Viscosities and PPF,

| SC | η 1 Pa | η 1,500 Pa | PPF |
|---|---|---|---|
| 30.0 | 0.102 | 0.105 | 0.96 |
| 42.3 | 43.500 | 33.200 | 1.31 |

In order to prove the suitability of this second polymer (being substantially Newtonian in the solids content range of 30-50, preferably 60 and more preferably 70%) one can also plot the log ETA/SC curve. The second polymer solution is substantially Newtonian if it has linearity over the range of solids content from 30 to 50 weight percent, preferably 30-60 or even 70 wt %. The above second polymer 14 the log ETA/SC curve was measured between 40.6 to 63.0%.

| SC | eta at 1 Pa |
|---|---|
| 40.9 | 2.3 |
| 45.6 | 5.2 |
| 47.8 | 11.0 |
| 55.7 | 42.0 |
| 59.1 | 99.6 |
| 63.0 | 468.0 |

Log ETA/SC curve fit (linear in log ETA vs SC), $y=0.0002e^{0.2288x}$ $R^2=0.9801$. the fact that $R^2$ is very close to 1 implies that the curve has a very close correlation to a linear curve. Preferably, $R^2$ is at least 0.9, more preferably 0.92. 0.94, 0.96 and 0.98.

Example Second Polymer 15

Example second polymer 15 as described in second polymer 1, concerns the preparation of the second polymer by the "distillation process" as described for second polymer 14 using same ratios VP as monomer A to EA as monomer B, but no monomer A was preloaded in the reactor. Furthermore the boosting process is used in order to obtain full conversion of the monomers. In an emulsion polymerization reactor 285 grams of MEK was added and heated to reflux (86° C.). The monomer pre-emulsion was prepared by adding the following raw materials in the feed tank: 605.3 grams of VP, 151.3 grams of EA and 6.7 grams of MEK. Emulsify the feed until a stable solution was obtained. A separate solution of 1.35 grams of the initiator AMBN and 71.2 grams of MEK is made in a separate dosing vessel. The monomer and initiator solution are dosed simultaneously to the reactor in 3 hours. The dosing vessel of the monomers is rinsed with 35.6 grams of MEK, the initiator vessel with 6.7 grams of MEK. During the polymerization the reflux temperature rises to 88° C. The distillation is started at 85° C. under atmospheric pressure and 56.6 grams of MEK was removed. Then in three subsequent dosing's—30 minutes dosing time and 60 minutes interval—of a mixture of 1.90 grams of AMBN and 3.30 grams of MEK—the second polymer is on conversion (free VP<0.05%, free EA<0.002%). Now 56.6 grams of MEK and 520.7 grams of demineralized water are added. Subsequent atmospheric distillation is performed and yielded 389.3 grams of a water/MEK mixture. Then vacuum distillation is performed (80 mbar) after addition of another 400 grams of water (in order to maintain reasonable viscosity for distillation) until the MEK level in the resin is below 0.1%. 342.4 Grams of distillate is obtained. The necessary amount of water to dilute the resin to a theoretical solids content of 58.6% is added, calculation based the sum of distillates. The resulting second polymer contains 0.032% free VP and 0.004% free EA and has a solids content of 57.0% based on Karl Fischer measurement of the water content. a weight average molecular weight of 52,000 g/mol and a number average molecular weight of 12,200 g/mol. Viscosities and PPF,

| SC | η 1 Pa | η 1,500 Pa | PPF |
|---|---|---|---|
| 42.3 | 0.700 | 0.631 | 1.11 |
| 50.0 | 2.750 | 2.690 | 1.02 |
| 57.0 | 13.680 | 13.260 | 1.03 |

Example Second Polymer 16

Example second polymer 16 concerns the preparation of the second polymer by the "solvent process", as described for second polymer 14 using NNDMA as monomer A and EA as monomer B and DPM as solvent. The resulting second polymer is a clear solution with a slight haze and has a theoretical solids content of 35.3%. Viscosities and PPF. Viscosity and PPF,

| SC | η 1 Pa | η 1,500 Pa | PPF |
|---|---|---|---|
| 42.3 | 0.476 | 0.467 | 0.98 |

Example Second Polymer 17

Example second polymer 17 concerns the preparation of the second polymer 8 but now by the "solvent process" (as described for second polymer 14) and more initiator. The resulting second polymer has a theoretical solids content of 42.3%, a weight average molecular weight of 47,400 g/mol and a number average molecular weight of 18,900 g/mol. Viscosities and PPF,

| SC | η 1 Pa | η 1,500 Pa | PPF |
|---|---|---|---|
| 42.3 | 0.646 | 0.629 | 1.03 |
| 47.6 | 1.528 | 1.502 | 1.02 |

Example Second Polymers 18-19

Example second polymer 18 the preparation of the second polymer by the "solvent process", as described for second polymer 14 but using N-vinyl imidazole as monomer A.

| SC | η 1 Pa | η 1,500 Pa | PPF |
|---|---|---|---|
| 40.6 | 7.00 | 6.65 | 1.05 |

Example second polymer 19 uses the preparation method of second polymer 8 but using N-vinyl caprolacton as monomer A.

| SC | η 1 Pa | η 1,500 Pa | PPF |
|---|---|---|---|
| 45.4 | 8.34 | 8.13 | 1.03 |

Example Second Polymer 20

Example second polymer 20 uses the preparation method of second polymer 8 but using MADAME (2-dimethyl aminoethyl methacrylate) as monomer A. Example second polymer 20 uses an ionisable monomer A in substantial amounts and is expected to be influenced extensively in rheology by pH or ions of the first polymer.

| SC | η 1 Pa | η 1,500 Pa | PPF |
|---|---|---|---|
| 40.4 | 0.926 | 0.913 | 1.01 |

Preparation of Coating Composition with the First and Second Polymer

The first polymer dispersion is present in the reactor and in 30 minutes the water soluble second polymer solution is dosed under slow stirring (1,000-1,500 rpm, 50-80 mm disc size depending on the diameter of the vessel (80-150 mm)). This mixing processes also referred to as hybridisation. Ratios are based on the solid polymers and vary between 99.5/0.5 to 50/50, the lowest values being the water soluble second polymer. Upon use of the water soluble polymers made with the solvent process (method A) the final level of co-solvent ranges between 1 and 5%. The final binder has a solids content between 35 and 48 wt % solids.

Two coating composition examples are described below. The solid to solid resin ratios of first polymer/second polymer used are varied between 99.5/0.5 and 50/50, as is shown in the tables from the paint examples (Table 3).

The neutralization of the coating compositions is only performed by addition of a neutralizing agent, only when necessary. The pH of the first polymers studied did not need pH corrections after hybridisation. The neutralizing agent can be added to the monomers or to the produced polymer. Suitable neutralization agents include metallic bases (e.g. potassium and sodium bases) or organic bases such as amines or ammonia, particularly ammonia or 2-amino-2-methyl-1-propanol).

Coating Composition 1

In a reactor 554.8 grams of the first polymer Setaqua® 6776 is loaded and kept at 25° C. In 30 minutes 100.0 grams of the second polymer example 14 is dosed under stirring at 25° C. The resulting hybrid is a milky polymer dispersion with a viscosity at 43.7% solids is at 1 Pa shear stress is 0.220 Pa·s, at 1,500 Pa shear stress 0.084 Pa·s and a PPF 2.62. Other coating compositions were prepared in the same way with different components as indicated in Table 5.

Coating Composition 2

In a reactor 758.0 grams of an auto-oxidatively drying polyurethane prepared according to Example 1 of WO2007131959A1 (the first polymer 1) is loaded and kept at 25° C. In 30 minutes 100.0 grams of the second polymer solution of Example 8 is dosed under stirring at 25° C. The resulting hybrid is a milky polymer dispersion with a viscosity at 47.2% solids is at 1 Pa shear stress is 0.582 Pa·s, at 1,500 Pa shear stress 0.147 Pa·s and a PPF 4.00.

Paint Preparation with the Open Time Polymers

Typical white top coat formulation were made according to the methods used by those skilled in the art. Amounts of components used in the white top coat formulation are depicted in Table 3. Table 4 shows typical parameters of the white top coat formulation.

Table 5 illustrates a selection of paints using several of the second polymers combined with a range of first polymers. The basic formulation is shown in Table 3 and the paint characteristics are shown in Table 4. Table 5 describes paint examples A-W including first polymer, second polymer, qualification watersoluble and substantial Newtonic second polymer (WS&N), volume solids (%) of the white top coat formulation (WTC), open time (OT), volatile organic components (VOC) including water (g/l), gloss at 20° (GU) after 7 days, Koenig Hardness KH (s) after 7 days, (PH is Persoz Hardness), early water resistance after 24 hrs, 1 hour exposure and 24 hrs recovery (EWR, 1=bad, 5=good). Legenda: # PH: Persoz hardness instead of Koenig hardness ICI viscosity.

Mill bases are made separately in a cooled vessel (ambient temperature). In the cooled vessel with dissolver stirring equipment, demi water, de-foamer, dispersant and surfactant are loaded. Subsequently the titanium dioxide is slowly added under high speed stirring (2,000-3,000 rpm, 50 mm disc size, diameter vessel 80 mm). After addition stirring is continued for 30 min. fineness of grind is below 10 μm.

The mill base is then ready for addition to the binder (the coating compositions prepared as described above) under stirring (1,000-1,500 rpm, 80 mm disc size, diameter vessel 150 mm) in the let-down vessel which is preloaded with the coating composition comprising the open time binder. When ready the demi water, defoamer, anti-slip agent, co-solvents, amine (adjustment of pH between 7.5 and 8.0 when needed), biocide, thickeners and again co-solvents (when higher VOC is needed) are added under stirring.

After one night stabilization, extra thickener is added until ICI viscosity of 2.7-3.0 Poise (10,000 sec-1). The next day paints are applied for all testing. Stability of paint is tested over 6 months at ambient temperature and 2 months at 40° C. It is judged on varnish floating, settlement of pigment, stir-ability and viscosity in(de)crease.

The neutralization of the paints is only performed when necessary by addition of a neutralizing agent, pH's of the white topcoats were aimed to 7.5-8.5, preferably to 7.8-8.0. Suitable neutralization agents include metallic bases (e.g. potassium and sodium bases) or organic bases such as amines or ammonia, particularly ammonia or 2-amino-2-methyl-1-propanol).

In Table 2 second polymers 1-6 have been neutralised with minor amounts of ammonia solution (25% in water) to pH 8.0-8.9, which causes the acidic acrylic monomers MAA of AA to be at least partially ionic. This causes a significant increase in hydrophilicity and resulting low EWR (examples E, F and G) which can be resolved by choosing a relatively small amount of said second polymers (example H). Monomers A are not in ionic form.

TABLE 3

Formulation of open time white top coat formulation

| | | typical (g) | Mill base | 100% (g) | Mill base |
|---|---|---|---|---|---|
| Mill base | | | | | |
| Byk 024 | Defoamer | 0.34 | | 0.13 | |
| Demiwater | Solvent | 13.66 | | 5.28 | |
| Tego Dispers 755 W | Dispersant | 3.41 | | 1.32 | |
| Surfynol 104 E | Surfactant | 1.71 | | 0.66 | |
| Ti Pure 706 | Pigment | 68.29 | | 26.38 | |
| total millbase | | | 87.4 | | 33.7 |
| Resins | | | | | |
| Hybrid polymer (41.0% solids) | Resin | 156.67 | | 60.52 | |
| Mill base addition to polymer | | | | | |
| Finalization of formulation | | | | | |
| Byk 028 | Defoamer | 0.46 | | 0.18 | |
| Tego Glide 410 (50% in DEGME) | Slip | 1.14 | | 0.44 | |
| Ethyldiglycol DEGME | Solvent | 10.47 | | 4.04 | |
| Acticide MBS | Biocide | 0.46 | | 0.18 | |
| AMP 95 is added if pH has to be adjusted between 7.8 and 8.0 | Dispersant | 0.76 | | 0.30 | |
| Rheolate FX 1070 till ICI viscosity 2.7-3.0 (poise) | Thickener | 1.52 | | 0.59 | |
| Total | | 258.9 | | 100.0 | |

TABLE 4 parameters of open time white top coat formulation

| Density | kg/l | 1.29 |
|---|---|---|
| Weight solid | % | 53.09 |
| Volume solid | % | 39.26 |
| P.V.C. | % | 21.74 |
| Cpvc (ratio) | % | 62.42 |
| Solid ratio pigment/binder | | 0.99 |
| Cosolvent on formulation | % | 4.61 |
| Water in formulation | % | 42.30 |
| V.O.C. | g/l | 130.0 |
| VOC incl. H2O | g/l | 59.7 |
| dispersant to pigment | | 6.12% |
| dispersant to resin | | 2.67% |
| Solvent to resin | | 15.40% |
| Defoamer to resin | | 0.51% |
| Thickener to resin | | 0.97% |

Paints A and B are a compilation of benchmarks where paints A are white trim paints that were not optimized on open time (classical well-known brands, using acrylic dispersion polymers e.g Rubbol BL 22 and 33, Valentine Valecryl) and paints B are well known modern white trim paints (benchmarks, known by professional and amateur painters such as Rubbol BL Azura, Rubbol BL Satura, Sigma S2U Novagloss and Sigma S2U Novasatin) with optimized open time (12-15 minutes), substantial VOC (100-120 g/l) and soft, slow drying films caused by the use of (urethane)-alkyd polymers possibly in combination with an acrylic dispersion polymer.

Paint C is a comparative example with first polymer 1 without second polymer. Paint D show the use of a second polymer based on an open time hydrophilic dispersion as described in WO2012/130817, example 1, where an increase in open time is observed from 9-10 minutes to 11-14 minutes when comparing the single use of first polymer 1 with the use of second dispersion polymer as mentioned above. The increase in open time is observed but substantially lower than examples P, Q, S, U and W. This shows that second polymers when made hydrophilic do not fit in invention.

Paints E till H—using all NNDMA as monomer A—second polymer 4 and 6—lead to excellent open times when using second polymer 9, but to unacceptable EWR when used in higher ratios: a 90/10 ratio is needed for acceptable EWR.

Paints I and J compare the use of PVP K-60—the homo polymer of VP—and shows doubling of open time to 16 minutes if compared to the paint I using no second polymer at all. It leads however to a drop of EWR from score 5.0 to 3.0 and a severe reduction in gloss level (from 73 to 39), thus showing that watersoluble homo-polymers lead to too water sensitive films having poor gloss.

Paints P till S show the increased open time upon use of the second polymer with various levels of second polymer 15 when compared to paint O using no second polymer.

In several paints examples the comparative example is also made using no second polymer: it shows in all cases a substantial increase in open time upon use of the second polymer (I versus J, O versus P till S, V versus W, X versus Y, Z versus AA, AB versus AC, AD versus AE and O versus AF)

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

TABLE 5

Paint compositions and properties

| Paint | 1st Pol | 2nd Pol | WS & N | 1st/2nd Pol | Vol SC (%) | OT | VOC (g/l) | GU 20° (%) | KH | EWR |
|---|---|---|---|---|---|---|---|---|---|---|
| A | commercial benchmark acrylic dispersion* | | | | 36-38 | 4-9 | (100-120) | 20-40 | 40-100 | 4-5 |
| B | 3 commerical benchmarks VOC 120 g/l, Vol SC 37%** | | | | 36-38 | 12-15 | (100-120) | 60-80 | 25-35 | 3-4 |
| C | 1st polymer 1 | | | 100/0 | 41 | 10 | DEGME 30 | 65-70 | 25-35 | 4-5 |
| D | 1st polymer 1 | Example 1, WO 2012/130817 | no | 50/50 | 37 | 14 | DEGME 29 | 65-70 | 35-50 | 3.0 |
| E | 1st polymer 1 | 4 | yes | 50/50 | 37 | 14 | DEGME 28 | 50-60 | nm | 1.0 |
| F | 1st polymer 1 | 6 | yes | 50/50 | 37 | 12 | DEGME 29 | 50-60 | nm | 1.0 |
| G | 1st polymer 1 | 6 | yes | 50/50 | 37 | 19 | DEGME 29 | 50-60 | nm | 1.0 |
| H | 1st polymer 1 | 6 | yes | 90/10 | 41 | 17-18 | DEGME 27 | 35 | 140 (# PH) | 4.0 |
| I | 1st polymer 1 | | | 100/0 | 40 | 8 | DEGME 30 | 73 | 35 | 5.0 |
| J | 1st polymer 1 | 7 | yes | 80/20 | 39 | 16 | DEGME 27 | 39 | 102 (# PH) | 3.0 |

TABLE 5-continued

Paint compositions and properties

| Paint | 1st Pol | 2nd Pol | WS & N | 1st/2nd Pol | Vol SC (%) | OT | VOC (g/l) | GU 20° (%) | KH | EWR |
|---|---|---|---|---|---|---|---|---|---|---|
| L | 1st polymer 1 | 11 | yes | 80/20 | 41 | 14 | DEGME 30 | 71 | 55 | 2.5 |
| K | 1st polymer 1 | 8 | yes | 80/20 | 39 | 17 | DEGME 30 | 66 | 53 | 4.5 |
| L | 1st polymer 1 | 8 | yes | 82.5/17.5 | 39 | 17 | DEGME 30 | 62 | 57 | 4.5 |
| M | 1st polymer 1 | 8 | yes | 85/15 | 39 | 15 | DEGME 30 | 65 | 53 | 5.0 |
| N | 1st polymer 1 | 14 | yes | 85/15 | 39 | 19 | DEGME 51 | 70 | 67 | 3.5 |
| O | Setaqua 6756 | | | 100/0 | 39 | 11 | DEGME 60 | 33 | 100 | 4.8 |
| P | Setaqua 6756 | 15 | yes | 99.5/0.5 | 40 | 12 | DPM/OX 2/1 16 | 41 | 82 | 4.7 |
| Q | Setaqua 6756 | 15 | yes | 98.5/1.5 | 40 | 14 | DPM/OX 2/1 16 | 40 | 81 | 4.7 |
| R | Setaqua 6756 | 15 | Yes | 95/5 | 40 | 14 | DPM/OX 2/1 16 | 40 | 87 | 4.3 |
| S | Setaqua 6756 | 15 | Yes | 85/15 | 40 | 15 | DPM/OX 2/1 16 | 45 | 90 | 4.3 |
| T | Setaqua 6756 | 15 | yes | 85/15 | 39 | 15 | DEGME 60 | 45 | 100 | 4.7 |
| U | Setaqua 6782 | 8 | yes | 85/15 | 38 | 13 | DEGME 30 | 40 | 59 | 4.5 |
| V | Setaqua 6776 | 14 | yes | 85/15 | 39 | 14 | DPM60 | 45 | 40 | 3.8 |
| W | Setaqua 6776 | 8 | yes | 85/15 | 39 | 10 | DPM60 | 46 | 48 | 4.0 |
| X | Setaqua 6784 | | | 100/0 | 39 | 7 | BDG60 | 31 | 71 | 5.0 |
| Y | Setaqua 6784 | 14 | yes | 85/15 | 39 | 16 | BDG60 | 50 | 58 | 4.5 |
| Z | Neocryl XK98 | | | 100/0 | 40 | 7 | DEGME 57 | 33 | 30 | 5.0 |
| AA | Neocryl XK98 | 15 | yes | 85/15 | 40 | 11 | DEGME 57 | 53 | 42 | 5.0 |
| AB | Setaqua 6788 | | | | 42 | 12 | DPM/OX 2/1 16 | 39 | 67 | 3.8 |
| AC | Setaqua 6788 | 15 | YES | 99.5/0.5 | 42 | 13 | DPM/OX 2/1 16 | 39 | 81 | 4.0 |
| AD | Setaqua EGO 6791 | | | | 43 | 10 | DPM/OX 2/1 16 | 31 | 30 | 4.7 |
| AE | Setaqua EGO 6791 | 15 | yes | 99.5/0.5 | 43 | 13 | DPM/OX 2/1 16 | 26 | 27 | 4.5 |
| AF | Setaqua 6756 | 18 | Yes | 85/15 | 32 | 13 | DEGME 66 | 46 | 97 | 4.8 |

What is claimed is:

1. An aqueous coating composition comprising one or more film-forming first polymers dispersed in an aqueous solution of a water soluble second polymer, wherein the water soluble second polymer is an addition co-polymer which is a random copolymer prepared from a monomer mixture comprising:
   a. 25-95 wt % non-ionic hydrophilic monomers A comprising an unsaturated group with a pendant group comprising at least one nitrogen in cyclic or linear amide or amine which is covalently bonded to the unsaturated group directly with the nitrogen (—N(-)—), a carbonyl (—(C=O)—), acetate (—O—(C=O)—) or C1-C5 alkylene (—R—),
   b. 5-75 wt % of hydrophobic monomers B selected from alkyl-, aryl- or arylalkylesters, of (meth) acrylic acid or styrenic monomers,
   c. 0-20 wt % of crosslinking monomers C different from monomers A and B comprising cross-linkable groups,
   d. 0-5 wt %, of hydrophilic ionic monomers D,
   e. 0-20 wt %, of monomers 1 different from monomers A-D,
   f. 0-10 wt % of chain transfer agents F,
   wherein the total weight of A to F is 100 wt % and wherein the water soluble second polymer comprises less than 20 wt %, relative to the total weight of the water soluble second polymer of (poly)ethylene oxide or (poly) propyleneoxide groups, and wherein the water soluble second polymer has a weight average molecular weight Mw of from 2,000 to 200,000 g/mol, determined by gel permeation chromatography using hexafluoro-i-propanol as eluent and using polymethyl methacrylate standards,
   wherein said water soluble second polymer is characterized in that a solution of only said second polymer in water has a substantially Newtonian flow behavior at solids contents ranging between 30 and 50 wt % of second polymer relative to total aqueous solution, characterized by a pseudo plasticity factor PPF of a solution comprising 50 wt % of the second polymer in water is lower than 3.0, wherein the PPF is defined as the viscosity at shear stress at 1 Pa divided by the viscosity at shear stress at 1500 Pa as determined in a shear stress flow measurement of an aqueous solution of the second polymer at room temperature (23° C.) using a viscometer with cone and plate configuration.

2. The aqueous coating composition according to claim 1 wherein the pendant group is selected from the group of i) (N)-amide ii) cyclic (N)-amide, iii) —(C=O)-amide, iv) cyclic —(C=O)-amide, v) cyclic (N)-amine, vi) cyclic (C)-amine and vii) (C=O)-esteramine wherein any amine is in non-ionic form.

3. The aqueous coating composition according to claim 1, wherein the non-ionic hydrophilic monomers A are selected from the group of
   i. Monomers comprising a pendant amide of the formula —N(—R)—C(=O)—R', groups, (Formula 1),
   ii. Monomers comprising a pendant cyclic amide of the formula —N(-)—C(=O)—R"—, wherein R"— forms a cyclic 3-6 atom ring with the N(-) (Formula 2),
   iii. Monomers comprising a pendant amide of the formula —C(=O)—N(—R')—R' (Formula 3),
   iv. Monomers comprising a pendant cyclic amide of the formula —C(=O)—N(-)—R"—, wherein R"— forms a cyclic 3-6 atom ring with the N(-) (Formula 4), v. Monomers comprising a pendant cyclic amine group of the formula —N(-)—R"— wherein R" forms a cyclic 3-6 atom ring with N(-) (Formula 5), vi. Monomers comprising a pendant cyclic amine of the formula —C(-)—N—R"— wherein R" forms a cyclic 3-6 atom ring with C(-) (Formula 6), vii. monomers comprising a pendant ester group of the formula —C(=O)—O—R'—N(—R)$_2$, (formula 7), R is a hydrogen or a hydrocarbon, R' is a hydrocarbon or a hydrocarbon with nitrogen or carbonyl or both and R" is a hydrocarbon or a hydrocarbon with at least one of nitrogen, oxygen or carbonyl in or on the cyclic ring, wherein each R, R' and R" is chosen independently of each other and each hydrocarbon comprises 5 or less connected carbon atoms and wherein any amine is in non-ionic form.

4. The aqueous coating composition according to claim 1, wherein the monomers A in the water soluble second polymer are chosen from the group of N-vinyl pyrrolidone, 2-(N,N-dimethylamino)ethyl(meth)acrylate, N,N-dimethyl(meth)acrylamide, N,N-diethyl(meth) acrylamide, N-vinyl imidazole, N-vinylcaprolactam, N-vinylsuccinimide, N-vinylpiperidone, 2-vinylpyridine, N-vinyl maleimide, N-vinyl citraconimide, N-vinyl phthalimide, 2-propenamide, N-[3-(dimethylamino)-2,2-dimethylpropyl]-methacrylamide, methacrylamido ethyl ethylene urea, 2-morpholinoethyl methacrylate, 2-morpholinoethyl, N-vinyl carbazole, N-vinyl acetamide, N-vinylpyrrolidone, N-vinyl caprolactam and 2-(N,N-dimethylamino)-ethyl(meth)acrylate.

5. The aqueous coating composition according to claim 1, wherein at least 60 wt %, of all non-ionic hydrophilic monomers A in the second polymer are monomers specified in claim 3 or 4.

6. The aqueous coating composition according to claim 1, wherein at least 60 wt %, of all hydrophobic monomers B in the second polymer are methyl-, ethyl- or butyl (meth)acrylate or mixtures thereof.

7. The aqueous coating composition according to claim 1, wherein the hydrophilic monomers A are characterised by a Hoy solubility parameter of the corresponding homopolymer of said monomers between 20.0 and 30.0 $(J/m^3)^{1/2}$.

8. The aqueous coating composition according to claim 1, wherein the hydrophobic monomers B are characterised by a Hoy solubility parameter of the corresponding homopolymer of said monomers between 16.0 and 26.0 $(J/m^3)^{1/2}$.

9. The aqueous coating composition according to claim 1, wherein the second polymer has an overall Hoy solubility parameter between 21.0 and 24.0 $(J/m^3)^{1/2}$.

10. The aqueous coating composition according to claim 1, wherein the cross-linkable monomers C are chosen from the group of unsaturated monomers comprising hydroxy, epoxy, amine or carbonyl crosslinking functional groups.

11. The aqueous coating composition according to claim 1, wherein the ionic monomers D, are in an amount less than 2 or 1 wt %.

12. The aqueous coating composition according to claim 1, wherein the water-soluble second polymer is obtained by addition polymerization of a monomer mixture comprising:
a. 25 to 95 wt % (N)-vinyl pyrrolidone, (N)-vinylcaprolactam or N,N-dimethylamino acrylamide monomers A,
b. 5 to 75 wt % C1-C4 alkyl(meth)acrylate monomers B,
c. 0 to 20 wt % cross-linking monomers C with a functional group for cross-linking,
d. no ethylenically unsaturated acid functional monomers D or precursors thereof,
e. 0-10 wt % monomers E different from monomers A to D
f. 0 to 10 wt % of chain transfer agents F,
wherein the sum of a) to f) is 100 wt %.

13. The aqueous coating composition according to claim 1, wherein the water soluble second polymers have a glass transition temperature Tg of from −30 to 180° C.

14. The aqueous coating composition according to claim 1, wherein the water soluble second polymer has a weight average molecular weight Mw of from 5,000 to 100,000 g/mol determined by gel permeation chromatography using hexafluoro-i-propanol as eluent and using polymethyl methacrylate standards.

15. The aqueous coating composition according to claim 1, wherein the one or more film-forming first polymers are selected from the group consisting of vinyl, polyurethane, polyurea-urethane, polyester, alkyd and epoxy polymers and hybrids or blends thereof, and ambient curing film-forming first polymers with a curing temperature between 5 and 50° C.

16. The aqueous coating composition according to claim 1, wherein the one or more film-forming first polymers are polymers having a weight average a molecular weight Mw between 2000 and 2,000,000 g/mole determined by gel permeation chromatography using hexafluoro-i-propanol as eluent and using polymethylmethacrylate standards or are crosslinked polymers.

17. The aqueous coating composition according to claim 1, comprising:
a. 60-98.8 wt % of the one or more film forming first polymers relative to total dry weight of the first and second polymer,
b. 0.2-40 wt % of one or more second polymers.

18. The aqueous coating composition according to claim 1, comprising:
a. 80-20 wt % water relative to the total weight of the aqueous coating composition;
b. 20-80 wt % of one or more first and one or more second polymers;
c. 0-30 wt % water miscible organic co-solvent;
d. 0-30 wt % coating additives;
the sum of a-d being 100 wt %.

19. The aqueous coating composition according to claim 1, comprising less than 20 wt % volatile organic solvent, wherein wt % is relative to the total weight of the coating composition.

20. A method of making a coating composition according to claims 1 to 19 comprising mixing an aqueous dispersion of one or more first polymers having a first polymer content between 25 and 70 wt % relative to the total weight of said aqueous dispersion, with an aqueous solution of one or more water soluble second polymers having a second polymer content of 25 to 55 wt %, relative to the total weight of said aqueous solution.

21. The method of making a coating composition according to claim 20, wherein the pH of the first polymer dispersion is from 4.5 to 8.5.

* * * * *